(12) United States Patent
Kawai et al.

(10) Patent No.: US 7,054,763 B2
(45) Date of Patent: May 30, 2006

(54) METHOD OF ESTIMATING FLOOR REACTIONS OF BIPEDAL WALKING BODY, AND METHOD OF ESTIMATING JOINT MOMENTS OF BIPEDAL WALKING BODY

(75) Inventors: Masakazu Kawai, Wako (JP); Yasushi Ikeuchi, Wako (JP); Hisashi Katoh, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 246 days.

(21) Appl. No.: 10/485,439

(22) PCT Filed: Jul. 26, 2002

(86) PCT No.: PCT/JP02/07592

§ 371 (c)(1),
(2), (4) Date: Jan. 30, 2004

(87) PCT Pub. No.: WO03/015997

PCT Pub. Date: Feb. 27, 2003

(65) Prior Publication Data

US 2004/0206164 A1 Oct. 21, 2004

(30) Foreign Application Priority Data

Aug. 1, 2001 (JP) ............................ 2001-234155
Feb. 27, 2002 (JP) ............................ 2002-050790

(51) Int. Cl.
*G01L 1/00* (2006.01)
*G01L 3/00* (2006.01)
*G01L 5/00* (2006.01)
*G06F 19/00* (2006.01)

(52) U.S. Cl. .......................................... 702/42; 73/760
(58) Field of Classification Search .................... None
See application file for complete search history.

(56) References Cited

U.S. PATENT DOCUMENTS

| 5,151,859 | A | * | 9/1992 | Yoshino et al. ................ 701/23 |
| 5,349,277 | A | * | 9/1994 | Takahashi et al. ........ 318/568.12 |
| 5,404,086 | A |   | 4/1995 | Takenaka et al. |
| 6,289,265 | B1 | * | 9/2001 | Takenaka et al. ............ 700/245 |

FOREIGN PATENT DOCUMENTS

| EP | 1 120 203 A1 | 8/2001 |
| JP | 2000-249570 | 9/2000 |

* cited by examiner

*Primary Examiner*—John Barlow
*Assistant Examiner*—Sujoy Kundu
(74) *Attorney, Agent, or Firm*—Rankin, Hill, Porter & Clark LLP

(57) ABSTRACT

Whether a motion state of leg bodies (2) is a single stance state or a double stance state is sequentially determined and a total reaction force (F) is estimated on the basis of an equation of motion for a center of gravity (G0) of a bipedal walking body (1). If the motion state is the single stance state, then the estimated value of the total floor reaction force (F) is directly used as an estimated value of the floor reaction force of the leg body (2). If the motion state is the double stance state, then a floor reaction force (Fr) of the leg body (2) at the rear side is determined, using measurement data of elapsed time of the double stance state and moving speed of a bipedal walking body (1) and pre-established characteristic data, and the floor reaction force (Fr) is subtracted from the total floor reaction force (F) to determine a floor reaction force (Ff) of the leg body (2) at the front side. Thus, it is possible to provide a method that allows floor reaction forces acting on leg bodies of a bipedal walking body, such as a human being, and moments acting on joints of the leg bodies to be determined in real time with high accuracy by a relatively simple technique.

11 Claims, 16 Drawing Sheets

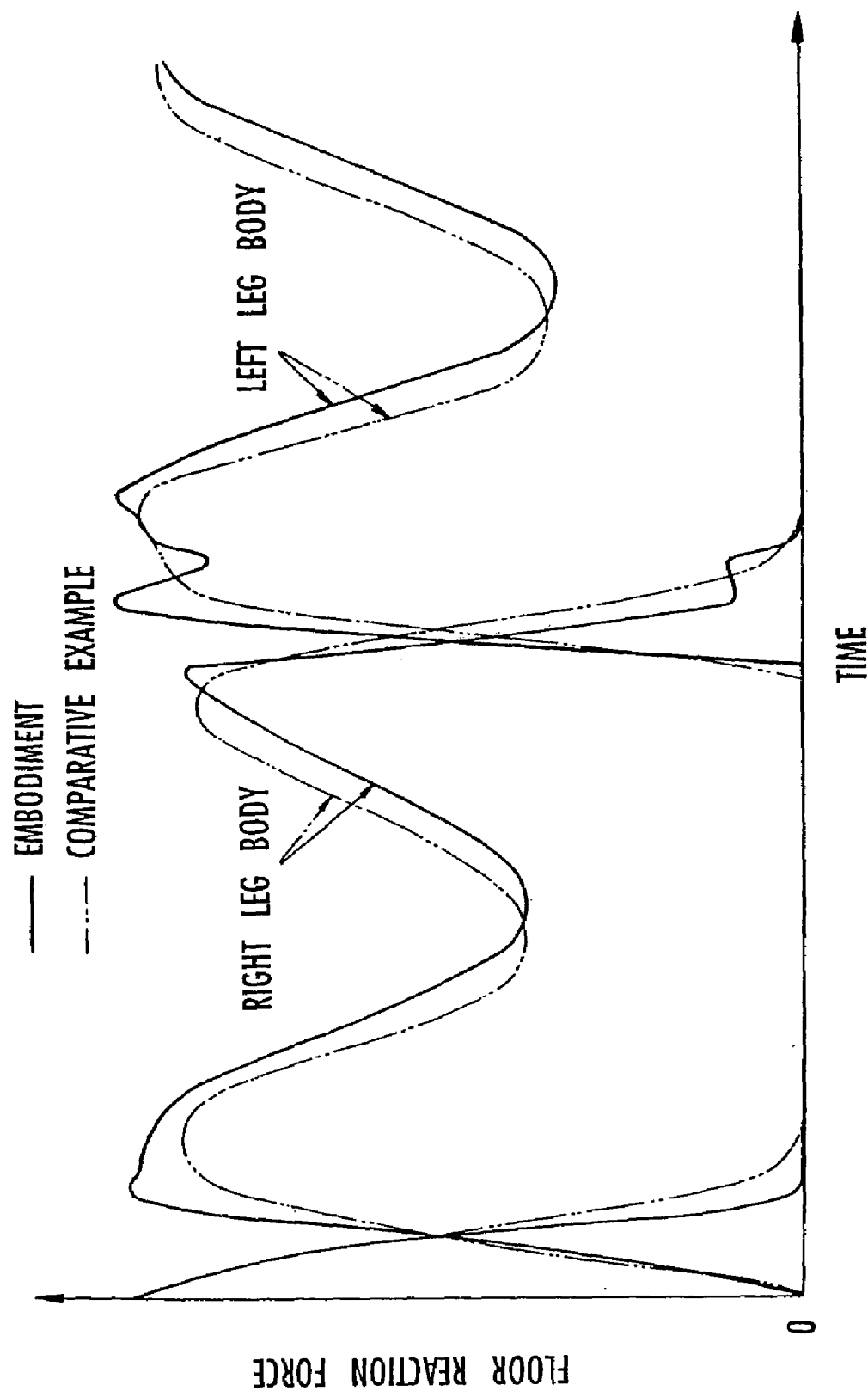

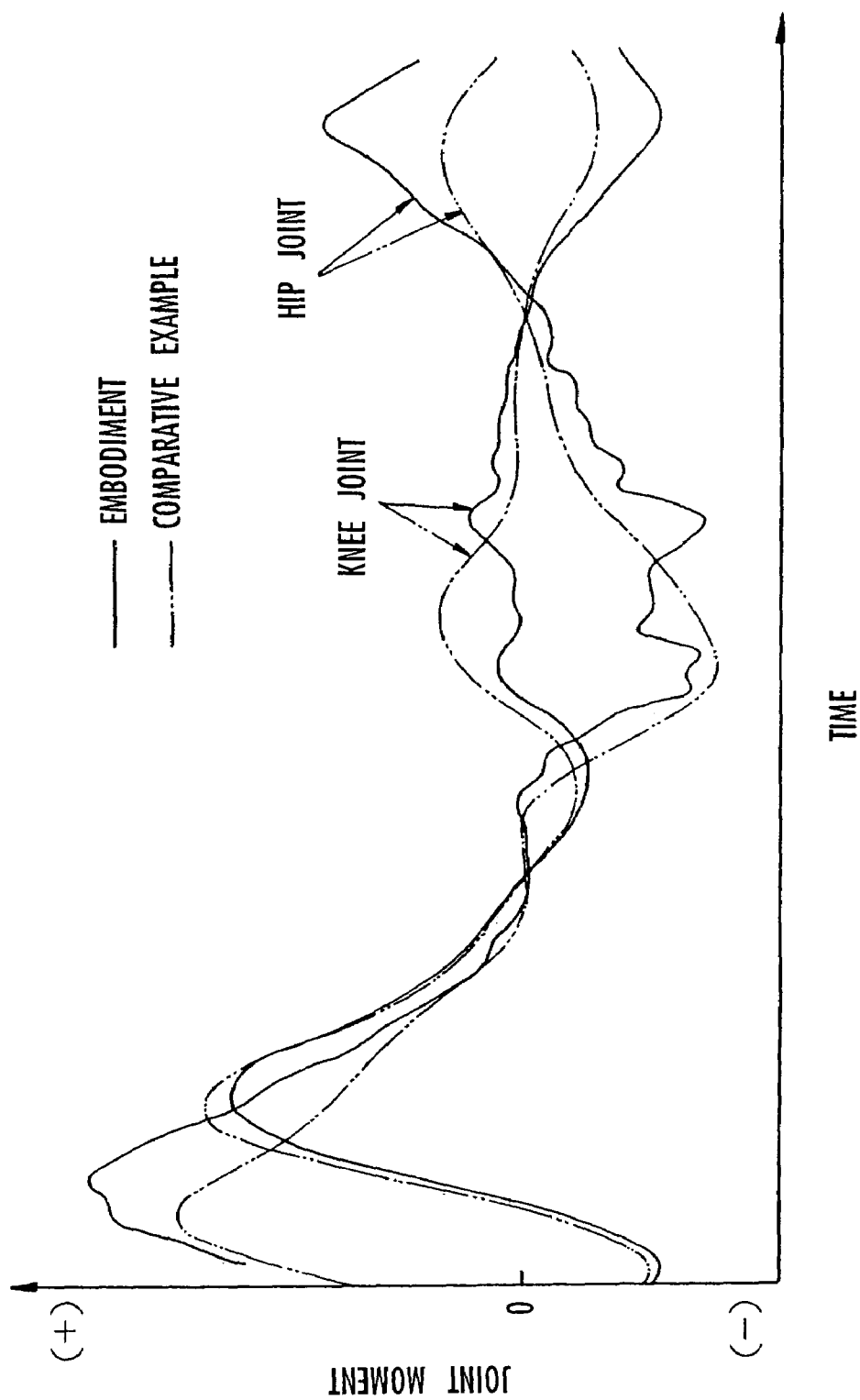

METHOD OF ESTIMATING FLOOR REACTIONS OF BIPEDAL WALKING BODY, AND METHOD OF ESTIMATING JOINT MOMENTS OF BIPEDAL WALKING BODY

TECHNICAL FIELD

The present invention relates to a method of estimating floor reaction forces acting on leg bodies of a bipedal walking body, such as a human being, a bipedal walking robot or the like. The present invention further relates to a method of estimating moments acting on joints of a leg body of a bipedal walking body by using the aforesaid estimated values of the floor reaction forces.

BACKGROUND ART

To control an operation of, for example, a walking assisting apparatus for aiding a human being in walking or to control traveling motions of a bipedal walking robot, it is necessary to sequentially determine floor reaction forces acting on leg bodies of the human being or the bipedal walking robot (to be more specific, the forces from a floor that act on grounding portions of the leg bodies). Determining the floor reaction forces makes it possible to acquire moments or the like acting on joints of the leg bodies of the bipedal walking body, and to decide target auxiliary forces of the walking assisting apparatus or desired drive torques or the like of joints of the bipedal walking robot on the basis of the determined moments or the like.

As a technique for determining the floor reaction forces, one disclosed in, for example, Japanese Unexamined Patent Application Publication No. 2000-249570 has been known. According to this technique, a floor reaction force of each leg body is defined as a resultant value (linear combination) of a plurality of trigonometric functions having mutually different cycles of 1/n (n=1, 2, . . . ) of a walking cycle, because time-dependent change waveforms of floor reaction forces of each leg body periodically change during steady walking of a bipedal walking body. In this case, weighting factors of the trigonometric functions for combining the plurality of trigonometric functions use predetermined values preset for each bipedal walking body or values obtained by adjusting the preset predetermined values according to topography.

However, the foregoing technique is adapted to determine floor reaction forces of the leg bodies for one step or a plurality of steps of the bipedal walking body. For this reason, it is difficult to accurately determine floor reaction forces if the gait of the bipedal walking body sequentially changes. Furthermore, to enhance the accuracy of determined floor reaction forces, the weighting factors of the trigonometric functions must be set for each bipedal walking body or adjusted according to topology or the like. This makes it difficult to accurately determine floor reaction forces by minimizing influences of environments under which bipedal walking bodies move or individual differences among bipedal walking bodies.

There has been known, for example, a bipedal walking robot having force sensors, such as six-axis force sensors, attached to ankles and foot portions of each leg body to determine floor reaction forces on the basis of outputs of the force sensors. There has been known another technique whereby a bipedal walking body is walked on a force plate installed on a floor to determine floor reaction forces from the outputs of the force plate.

According to the technology using force sensors, however, in order to determine the floor reaction forces of human leg bodies, in particular, force sensors have to be attached to ankles and foot portions, so that the force sensors inconveniently interfere with walking in normal living environments. The technology using force plates allows floor reaction forces to be determined only in environments wherein the force plates are installed.

The present invention has been made with a view of the aforementioned background, and it is an object thereof to provide a method of estimating floor reactions that permits floor reaction forces to be accurately determined in real time by a relatively simple technique and that is ideally suited for determining floor reaction forces of human beings, in particular, as bipedal walking bodies.

It is a further object of the present invention to provide a method of estimating joint moments of a bipedal walking body that allows moments acting on joints, such knee joints, of leg bodies to be accurately determined in real time by using an estimated value of a floor reaction force thereof.

DISCLOSURE OF INVENTION

First, a basic concept of the method of estimating floor reaction forces of a bipedal walking body in accordance with the present invention will be explained.

Motion states of leg bodies of a bipedal walking body (motion states of the leg bodies during walking) include a single stance state in which only one leg body 2 (the front leg body in relation to the direction of travel in the figure) of both leg bodies 2 and 2 of a bipedal walking body 1 is in contact with the ground, as illustrated in FIG. 1(a), and a double stance state in which both leg bodies 2 and 2 are in contact with the ground, as shown in FIG. 1(b).

If a total floor reaction force acting on the two leg bodies 2 and 2 from a floor A is denoted by F, then the total floor reaction force F is equal to the floor reaction force acting on the leg body 2 in contact with the ground in the single stance state shown in FIG. 1(a), while it is a resultant force of floor reaction forces Ff and Fr acting on the two leg bodies 2 and 2, respectively, in the double If a total floor reaction force acting on the two leg bodies 2 and 2 from a floor A is denoted by F, then the total floor reaction force F is equal to the floor reaction force acting on the leg body 2 in contact with the ground in the single stance state shown in FIG. 1(a), while it is a resultant force of floor reaction forces Ff and Fr acting on the two leg bodies 2 and 2, respectively, in the double stance state shown in FIG. 1(b). If components in an X-axis direction (horizontal direction in relation to the direction of travel of the bipedal walking body 1) and in a Z-axis direction (vertical direction) of an acceleration a of a center of gravity G0 of the bipedal walking body 1 in an absolute coordinate system Cf fixed with respect to the ground are denoted by ax and az, respectively, and components in the X-axis direction and the Z-axis direction of the total floor reaction force F acting on the bipedal walking body 1 are denoted by Fx and Fz, respectively, then an equation of motion of the center of gravity G0 (more specifically, an equation of motion related to translational motion of the center of gravity G0) is represented by an expression (1) below:

$$^{T}(Fx, Fz-M \cdot g) = M \cdot {}^{T}(ax, az) \qquad (1)$$

(where M: Weight of the bipedal walking body; g: Gravitational acceleration)

The parenthesized part $^{T}(,)$ of both sides in expression (1) means a two-component vector. In the present description, the symbol $^{T}(,)$ denotes a vector.

In other words, the equation of motion of the center of gravity G0 is a relational expression indicating that a product of the acceleration a of a center of gravity G0 and the weight M of the bipedal walking body 1 is equal to a resultant force of a gravity acting on the center of gravity G0 (=M·g) and the total floor reaction force F.

Therefore, if the acceleration $a=^T(ax, az)$ of the center of gravity G0 of the bipedal walking body 1 is determined, then an estimated value of the total floor reaction force $F=^T(Fx, Fz)$ can be obtained by expression (2) given below, using the aforesaid acceleration a, the value of the weight M of the bipedal walking body 1, and the value of the gravitational acceleration g:

$$^T(Fx, Fz)=M\cdot^T(ax, az+g) \quad (2)$$

In the single stance state shown in FIG. 1(a), the floor reaction force acting on the single leg body 2 in contact with the ground is equal to the foregoing total floor reaction force F, so that an estimated value of the floor reaction force F acting on the single leg body 2 will be obtained by expression (2).

In this case, the weight M necessary to obtain an estimated value of the floor reaction force F can be known in advance by measurement or the like. As will be discussed in detail hereinafter, the position of the center of gravity G0 and the acceleration a can be sequentially determined by a publicly known techniques or the like, using outputs of sensors, such as a sensor for detecting a bending angle (rotational angle) of each joint of the bipedal walking body 1, an accelerometer, a gyro sensor, and the like.

Meanwhile, regarding the double stance state shown in FIG. 1(b), a floor reaction force acting on the leg body 2 at the rear in relation to the direction of travel of the bipedal walking body 1 is expressed as $Fr=^T(Frx, Frz)$, while a floor reaction force acting on the leg body 2 at the front is expressed as $Ff=^T(Ffx, Ffz)$. At this time, as will be discussed in detail later, according to the knowledge of the inventors of the present application, the components Frx and Frz of the floor reaction force Fr acting on the rear leg body 2, in particular, exhibit characteristic changes having marked correlation with respect to the time elapsed from the start of the double stance state and the moving speed of the bipedal walking body 1. Therefore, preparing characteristic data representing such characteristics (maps, data tables, approximate function expressions, or the like) by performing various experiments, simulations and the like makes it possible to estimate the floor reaction force Fr acting on the rear leg body 2 on the basis of the characteristic data. The resulting force of the floor reaction force Fr acting on the rear leg body 2 and the floor reaction force Ff acting on the front leg body 2 provides the total floor reaction force F obtained by the foregoing expression (2). Hence, as shown by expression (3) below, an estimated value of the floor reaction force Ff acting on the front leg body 2 can be determined by subtracting the estimated value of the floor reaction force Fr acting on the rear leg body 2 determined on the basis of the characteristic data described above from the estimated value of the total floor reaction force F (vector subtraction).

$$Ff=F-Fr=^T(Fx-Frx, Fz-Frz) \quad (3)$$

Accordingly, in the double stance state, if the moving speed of the bipedal walking body 1 and the time elapsed from the start of the double stance state are determined, then estimated values of the floor reaction forces Fr and Ff of the two leg bodies 2 can be determined, using the above measured values and an estimated value of the total floor reaction force F. In this case, the moving speed of the bipedal walking body 1 can be determined by, for example, using measurement data or the like of tilt angles of a thigh and a crus of each leg body 2, as will be described in detail hereinafter.

Based on the explanation above, the present invention will now be explained. To fulfill the foregoing objects, a method of estimating floor reaction of a bipedal walking body, that is, a method of estimating floor reaction forces acting on individual leg bodies of the bipedal walking body, includes a first step for determining whether a motion state of leg bodies of the bipedal walking body is a single stance state wherein only one of the leg bodies is in contact with the ground or a double stance state wherein both leg bodies are in contact with the ground; a second step for sequentially determining positions of the center of gravity of the bipedal walking body while also sequentially determining accelerations of the centers of gravity in an absolute coordinate system fixed with respect to the ground, using time-series data of the positions of the centers of gravity; a third step for sequentially determining estimated values of total floor reaction force on the basis of an equation of motion of the centers of gravity represented by a weight of the bipedal walking body, a gravitational acceleration, the accelerations of the centers of gravity, and a total floor reaction force, which is a resultant force of the floor reaction forces acting on the respective leg bodies; a fourth step for sequentially measuring time elapses from a start of the double stance state until an end thereof each time the double stance state begins; and a fifth step for measuring a moving speed of the bipedal walking body at least before each double stance state is begun. Furthermore, a method of the present invention comprises the steps of sequentially determining estimated values of the total floor reaction force as estimated values of floor reaction forces acting on a single leg body in contact with the ground when the bipedal walking body is in the single stance state, and sequentially determining estimated values of floor reaction forces acting on one of the two leg bodies, the one leg body being located at the rear side in relation to the direction of travel of the bipedal walking body, on the basis of characteristic data pre-established as indicative of characteristics of changes in floor reaction force acting on the above one leg body with respect to the elapsed time of the double stance state and moving speed of the bipedal walking body, and sequentially determine estimated values of the floor reaction forces acting on the other leg body when the bipedal walking body is in the double stance state by subtracting the determined estimated values of the floor reaction forces of the one leg body from the estimated values of the total floor reaction force.

According to the present invention, in the third step, estimated values of the total floor reaction force are sequentially determined (refer to expression (2)) according to the aforementioned equation of motion of the center of gravity of the bipedal walking body (refer to expression (1)) on the basis of values of the weight, the gravitational acceleration and the center of gravity acceleration of the bipedal walking body. Then, in the first step, it is determined whether the motion states of the leg bodies of the bipedal walking body are in the single stance state or the double stance state, and estimated values of the floor reaction forces are determined by techniques based on the respective support states. More specifically, in the single stance state of the bipedal walking body, an estimated value of the total floor reaction force directly provides an estimated value of the floor reaction force acting on a single leg body in contact with the ground.

At this time, the floor reaction force acting on the leg body not in contact with the ground (the free leg) is "zero."

In the double stance state of the bipedal walking body, an estimated value of a floor reaction force acting on one leg body located at the rear side in relation to the direction of travel of the bipedal walking body is determined on the basis of the aforementioned characteristic data, using measurement data of time elapsed from a start of the double stance state and measurement data of the moving speed of the bipedal walking body. Furthermore, an estimated value of the floor reaction force acting on the other leg body is determined by subtracting the estimated value of the floor reaction force of the foregoing one leg body from an estimated value of the total floor reaction force determined in the third step (performing vector subtraction) (refer to expression (3)).

According to the present invention, an estimated value of the total floor reaction force is used to determine a floor reaction force acting on each leg body in both the single stance state and the double stance state. The weight of the bipedal walking body necessary to determine an estimated value of the total floor reaction force may be obtained beforehand by measurement or the like. The positions of center of gravity and the accelerations of the bipedal walking body can be determined in real time, using data of outputs of relatively small sensors that can be easily attached to a bipedal walking body, such as a sensor (potentiometer or the like) for detecting bending angles (rotational angles) of each joint of the bipedal walking body, and an accelerometer, a gyro sensor, and the like.

Thus, the method of estimating floor reactions in accordance with the present invention makes it possible to determine floor reaction forces in real time by a relatively simple technique without the need for attaching force sensors to ankles and foot portions of a bipedal walking body or using a force plate.

In the method for estimating floor reaction forces in accordance with the present invention, the characteristic data is, for example, the data indicating a relationship between a ratio of a floor reaction force of the one leg body to the total floor reaction force at a start of the double stance state and a ratio of the elapsed time to a duration from a start to an end of the double stance state, a duration of the double stance state is estimated from a measured value of the moving speed on the basis of a pre-established correlation between the moving speed of the bipedal walking body and the duration of the double stance state, and an estimated value of a floor reaction force acting on the one leg is sequentially determined on the basis of the estimated value of the duration of the double stance state, a measured value of the elapsed time, an estimated value of the total floor reaction force at the start of the double stance state, and the characteristic data.

More specifically, according to the knowledge of the inventors of the present application, if attentions are focused on the relationship between a ratio of a floor reaction force of the one leg body (the leg body at the rear side in relation to the direction of travel of the bipedal walking body) with respect to the total floor reaction force at the start of the double stance state and a ratio of the elapsed time with respect to a duration from a start to an end of the double stance state, then the ratio of the floor reaction force exhibits a substantially constant change with respect to the ratio of the elapsed time, regardless of the moving speed or the like of the bipedal walking body. Hence, characteristic data can be easily set by defining the characteristic data as the data representing the relationship between the ratio of floor reaction forces and the ratio of elapsed time described above.

In this case, the duration of the double stance state, which provides a reference of the ratio of elapsed time, changes with the moving speed of the bipedal walking body. If the moving speed remains constant, then the duration of the double stance state will be substantially constant. Accordingly, establishing beforehand the correlation between the moving speed and the duration of the double stance state makes it possible to properly estimate the duration of the double stance state on the basis of the correlation from a measured value of the moving speed. The total floor reaction force, which provides a reference of the ratio of floor reaction force acting on the one leg body, is estimated on the basis of an equation of motion of the center of gravity of the bipedal walking body.

Therefore, to estimate the floor reaction forces of the respective leg bodies in the double stance state, as described above, the characteristic data is established as the correlation data between a ratio of the floor reaction forces of the one leg body based on the total floor reaction force at the start of the double stance state and a ratio of the elapsed time based on the duration of the double stance state, and an estimated value of the duration of the double stance state, which is determined from a measured value of the moving speed, a measured value of the elapsed time of the double stance state, and an estimated value of the total floor reaction force at the start of the double stance state are applied with the aforesaid characteristic data. This makes it possible to properly determine with high accuracy an estimated value of the floor reaction force acting on the one leg body.

Floor reaction forces are vector quantities. To be more specific, therefore, a ratio of the floor reaction force of the one leg body to the total floor reaction force is a ratio of each component of the floor reaction force in a certain appropriate coordinate system (e.g., a coordinate system fixed with respect to a floor on which a bipedal walking body moves).

A method of estimating floor reactions in accordance with the present invention includes, to measure a moving speed of a bipedal walking body in the fifth step, the steps of measuring a tilt angle of a crus under a knee joint of each leg body of the bipedal walking body and a tilt angle of a thigh between a hip joint and a knee joint of the leg body at a start of each double stance state, a step for calculating, at a start of each double stance state, a shift amount of a position of a bottom end portion of the crus of the leg body with respect to the hip joint of the leg body existing at the rear side in relation to the direction of travel of the bipedal walking body, the shift taking place in the direction of travel of the bipedal walking body from the start of the preceding double stance state, on the basis of measured values of tilt angles of the thigh and the crus of the leg body and predetermined sizes of the thigh and the crus of the leg body, and measuring the time elapsed from a start of each double stance state to a start of the next double stance state as elapsed time for one step. In the fifth step, each time the double stance state begins, the shift amount calculated at the start is divided by the one-step elapsed time measured from a start of the preceding double stance state to a start of the present double stance state so as to determine a measured value of the moving speed.

More specifically, an amount of a shift in the position of a bottom end portion of the crus of the leg body with respect to the hip joint of the leg body (this leg body being the one in contact with the ground in the single stance state immediately before each double stance state begins) existing at the rear side in relation to the direction of travel of the bipedal walking body at a start of each double stance state, the shift taking place in the direction of travel of the bipedal walking body from the start of the preceding double stance state will be the amount of distance over which the hip joint of the leg body (a proximal end portion of the leg body) has moved per step from a start of the preceding double stance state to a start of the present double stance state. Accordingly, an average moving speed of the bipedal walking body during the one-step elapsed time will be determined by dividing the aforesaid shift amount by the aforesaid one-step elapsed time, which is the time elapses from the start of the preceding double stance state to the start of the present double stance state. In this case, the shift amount can be determined by geometric computation using measured values of tilt angles of the thigh and the crus, respectively, of the leg body, which exists at the rear side when the double stance state begins, the tilt angles being measured at the starts of the present and the preceding double stance states, and data of the sizes (to be more specific, the lengths) of the thigh and the crus. Furthermore, the tilt angles of the thigh and the crus of each leg body can be measured using a sensor for detecting bending angles of joints of leg bodies or other sensors, such as an accelerometer, and a gyro sensor.

Thus, the moving speed of the bipedal walking body that is required for determining an estimated value of a floor reaction force acting on each leg body in the double stance state can be easily measured without using a large sensor or the like. Moreover, the moving speed measured is the moving speed immediately before a start of each double stance state, so that the reliability can be improved, eventually permitting higher accuracy of estimated values of floor reaction forces in the double stance state to be achieved.

Furthermore, the method of estimating floor reactions in accordance with the present invention comprises the steps of sequentially measuring vertical accelerations of a lower portion of a torso, which is adjacent to a hip joint, the torso being supported on the two leg bodies through the intermediary of hip joints of the leg bodies, wherein a motion state of the bipedal walking body is determined in the first step as follows. It is determined as the beginning of the double stance state and the end of the single stance state when the vertical acceleration of the lower portion of the torso increases to a predetermined threshold value or more, whereas it is determined as the end of the double stance state and the beginning of the single stance state when an estimated value of the floor reaction force acting on the leg body located at the rear side in relation to the direction of travel of the bipedal walking body in the double stance state decreases to a predetermined threshold value or less.

Alternatively, especially regarding the determination of an end of the double stance state (a start of the single stance state), according to the present invention for estimating the duration of the double stance state, as described above, a motion state of the bipedal walking body may be determined that the double stance state ends and the single stance state begins when a measured value of elapsed time from a start of the double stance state reaches an estimated value of a duration of the double stance state.

More specifically, while the bipedal walking body is moving (walking), when a motion state of the leg body switches from the single stance state to the double stance state, a vertical acceleration (upward acceleration) of the lower portion of the torso temporarily increases by a great extent when a leg body on a free leg side touches the ground. This phenomenon usually does not take place in other motion states of the leg bodies. Hence, comparing the acceleration with a predetermined threshold value (relatively large threshold value) makes it possible to accurately determine an end of the single stance state and a start of the double stance state.

When the motion states of leg bodies switch from the double stance state to the single stance state, the moment one leg body leaves a floor, the floor reaction force acting on that leg body reduces to zero. Hence, comparing the floor reaction force acting on the leg body with a predetermined threshold value (e.g., a threshold value slightly larger than zero) makes it possible to properly determine an end of the double stance state and a start of the single stance state. Especially when estimating a duration of the double stance state, the time elapsed from a start of the double stance state reaches an estimated value of the duration when a motion state of the leg body switches from the double stance state to the single stance state, thus allowing the end of the double stance state and the start of the single stance state to be accurately determined.

As discussed above, determining a motion state of leg bodies makes it possible to accurately determine whether the motion state is the single stance state or the double stance state. As a result, it is possible to switch, at a precise timing, between methods for calculating estimated values of floor reaction forces that differ between the single stance state and the double stance state, leading to higher accuracy of the estimated values of floor reaction forces. A vertical acceleration of a lower portion of a torso that is necessary to determine motion states of the leg bodies can be easily known from outputs of, for example, an accelerometer attached to the lower portion of the torso.

In the case of a human being or the like, in which a torso has a waist connected to both leg bodies through the intermediary of hip joints and a chest located above the waist such that it can be inclined with respect to the waist, the vertical acceleration of the lower portion of the torso to be measured is preferably a vertical acceleration of the waist.

In a method for estimating floor reactions in accordance with the present invention, various methods are conceivable and various publicly known methods can be used for determining a position of the center of gravity and an acceleration of the center of gravity of a bipedal walking body in the aforesaid second step. It is preferred, however, to determine the position of the center of gravity and the acceleration of the center of gravity according to the following method.

The method comprises the steps of sequentially measuring tilt angles of a torso supported on the two leg bodies through the intermediary of hip joints of the respective leg bodies, bending angles of at least hip joints and knee joints of the respective leg bodies, and accelerations of a predetermined reference point of the bipedal walking body in the absolute coordinate system, wherein in the second step, positions of the center of gravity of the bipedal walking body with respect to the reference point are sequentially determined on the basis of a tilt angle of the torso, bending angles of the hip joints and the knee joints, a rigid body link model representing the bipedal walking body in the form of a link assembly of a plurality of rigid bodies, pre-acquired weights of individual portions of the bipedal walking body, which correspond to individual rigid bodies of the rigid body link model, and the pre-acquired positions of the centers of gravity of the portions corresponding to rigid bodies in the respective portions corresponding to rigid bodies, accelerations of the center of gravity with respect to the reference point are sequentially determined on the basis of time-series data of the positions of center of gravity, and accelerations of the center of gravity in the absolute coordinate system are determined from the accelerations of the center of gravity with respect to the reference point and the accelerations of the reference point in the absolute coordinate system.

When a reference point is arbitrarily set in the bipedal walking body, a position of center of gravity of the bipedal walking body with respect to the reference point is generally decided by a mutual relationship among postures of a torso, thighs from hip joints to knee joints of respective leg bodies, and cruses under the knee joints. The posture relationship can be known from measurement data obtained by measuring tilt angles of the torso and bending angles of the hip joints and the knee joints. As will be discussed in detail hereinafter, if the aforesaid rigid body link model (e.g., a model assuming that an upper portion (including a torso) of the hip joints of the two leg bodies of the bipedal walking body, the thighs of the respective leg bodies, and the cruses as rigid bodies) is assumed, then a position of the center of gravity of the bipedal walking body with respect to the reference point can be determined on the basis of the weights of the portions corresponding to the rigid bodies of the bipedal walking body, the positions of the centers of gravity of the portions corresponding to the rigid bodies in the portions corresponding to the rigid bodies (to be more specific, the positions of the portions corresponding to the rigid bodies in a coordinate system fixed for the portions corresponding to the rigid bodies), and the aforementioned posture relationship. Furthermore, the accelerations of the center of gravity with respect to the reference point can be determined as two-level differential values of the positions of center of gravity obtained from the time-series data of the positions of center of gravity. Hence, by measuring the accelerations of the reference point in the absolute coordinate system beforehand, the accelerations of the center of gravity of the bipedal walking body in the absolute coordinate system are determined in terms of resultant accelerations of the accelerations of the center of gravity with respect to the reference point and the accelerations of the reference point.

In this case, the tilt angles of the torso necessary to determine the accelerations of the bipedal walking body can be determined from outputs of an accelerometer and a gyro sensor attached to the torso and another sensor, such as an inclinometer, as described above, and the bending angles of the hip joints and knee joints of the respective leg bodies can be determined from outputs of a sensor, such as a potentiometer, attached to the locations of the respective joints. Furthermore, the accelerations of the reference point in the absolute coordinate system can be obtained from outputs of a sensor, such as an accelerometer, attached to a portion integral with the reference point. In addition, the weights of the portions corresponding to individual rigid bodies of the bipedal walking body and the positions of the center of gravity of the portions corresponding to rigid bodies in the portions corresponding to individual rigid bodies can be obtained by measurement or the like in advance.

Thus, the positions of center of gravity and accelerations of a bipedal walking body can be easily determined in real time without the need for attaching a relatively large sensor or the like to the bipedal walking body.

Preferably, the reference point is set in the torso when determining the positions of center of gravity and accelerations of a bipedal walking body, as described above. This makes it possible to attach a sensor, such as an accelerometer, for measuring accelerations of the reference point in the absolute coordinate system to the torso, so that the number of sensors attached to leg bodies can be reduced, making it possible to prevent the sensors from interfering with a walking motion of the bipedal walking body.

In the case of a human being or the like having a waist connected to the two leg bodies through the intermediary of hip joints, and a chest located on the waist such that it may be tilted with respect to the waist, tilt angles of the torso used to determine the position of center of gravity are preferably tilt angles of the waist and the chest, respectively. Especially in this case, the rigid body link model is preferably a model that represents cruses under knee joints of the leg bodies of the bipedal walking body, thighs between the knee joints and the hip joints, the waist, and a body including the chest located on the waist, as respective rigid bodies.

With this arrangement, if a bipedal walking body is a human being, positions of center of gravity and accelerations thereof can be accurately determined, thus permitting higher accuracy of estimated values of floor reaction forces to be achieved.

A method of estimating joint moments of a bipedal walking body in accordance with the present invention is a method for estimating a moment acting on at least one joint of respective leg bodies of the bipedal walking body by using estimated values of floor reaction forces regarding the leg bodies sequentially determined by the method of estimating floor reactions in accordance with the present invention described above. The method of estimating joint moments in accordance with the present invention comprises the steps of sequentially measuring tilt angles of a torso supported on the two leg bodies through the intermediary of hip joints of the respective leg bodies, bending angles of at least hip joints and knee joints of the respective leg bodies, and an acceleration in the absolute coordinate system of a predetermined reference point of the bipedal walking body, sequentially determining tilt angles of portions corresponding to rigid bodies of the bipedal walking body that are associated with respective rigid bodies of a rigid body link model on the basis of the tilt angles of the torso, the bending angles of the hip joints and the knee joints of the leg bodies, and the rigid body link model representing the bipedal walking body in the form of a link assembly of a plurality of rigid bodies, sequentially determining positions of centers of gravity of the portions corresponding to rigid bodies in relation to the reference point on the basis of the tilt angles of the portions corresponding to the rigid bodies, pre-acquired weights of individual portions of the bipedal walking body, which correspond to individual rigid bodies of the rigid body link model, and pre-acquired positions of the centers of gravity of the portions corresponding to rigid bodies in the individual portions corresponding to rigid bodies, and for sequentially determining accelerations of the centers of gravity of the portions corresponding to rigid bodies in relation to the reference point on the basis of time-series data of the positions of centers of gravity of the portions corresponding to the rigid bodies, sequentially determining accelerations of the centers of gravity of the portions corresponding to the rigid bodies in the absolute coordinate system from the accelerations of the centers of gravity of the portions corresponding to the rigid bodies in relation to the reference point and the accelerations of the reference point in the absolute coordinate system, sequentially determining angular accelerations of the portions corresponding to the rigid bodies on the basis of time-series data of the tilt angles of the portions corresponding to the rigid bodies, and sequentially determining estimated positions of points of application of floor reaction forces of the leg bodies in the bipedal walking body on the basis of at least either tilt angles of thighs of the leg bodies as the portions corresponding to the rigid bodies of the bipedal walking body or bending angles of knee joints of the leg bodies, wherein a moment acting on at least one joint of the leg bodies of the bipedal walking body is estimated on the basis of an inverse dynamic model by using the estimated values of the floor reaction forces, estimated positions of points of application of floor reaction forces, the accelerations of the centers of gravity of the portions corresponding to the rigid bodies and the angular accelerations of the portions corresponding to the rigid bodies in the absolute coordinate system, the tilt angles of the portions corresponding to the rigid bodies, pre-acquired weights and sizes of the portions corresponding to the rigid bodies, pre-acquired positions of the centers of gravity of the portions corresponding to the rigid bodies in the respective portions corresponding to the rigid bodies, and pre-acquired inertial moments of the portions corresponding to the rigid bodies.

If, as described above, the second step in the method of estimating floor reactions includes a step for measuring a tilt angle of a torso, bending angles of hip joints and knee joints, respectively, of leg bodies, and an acceleration of a reference point of the bipedal walking body in the absolute coordinate system so as to determine a position of center of gravity, etc., of the bipedal walking body in relation to the reference point, then there is no need to measure them anew. As the rigid link model, the same rigid link model as that used for determining the position of the center of gravity, etc., of the bipedal walking body may be used.

According to the method of estimating joint moments in accordance with the present invention, measurement data obtained by measuring tilt angles of a torso and bending angles of hip joints and knee joints makes it possible to determine tilt angles of the portions corresponding to the rigid bodies of the bipedal walking body, including the torso, thighs and cruses (representing a mutual posture relationship among the portions corresponding to the rigid bodies). Positions of the centers of gravity of the portions corresponding to the rigid bodies in relation to the reference point can be determined on the basis of the weights of the portions corresponding to the rigid bodies, the positions of the centers of gravity of the portions corresponding to the rigid bodies in the respective portions corresponding to the rigid bodies (more specifically, positions of the portions corresponding to the rigid bodies in a coordinate system fixed with respect to the portions corresponding to the rigid bodies), and tilt angles of the portions corresponding to the rigid bodies. Furthermore, the accelerations of the center of gravity of the respective portions corresponding to the rigid bodies with respect to the reference point can be determined as two-level differential values of the positions of center of gravity obtained from the time-series data of the positions of center of gravity. Hence, by measuring the accelerations of the reference point in the absolute coordinate system beforehand, the accelerations of the centers of gravity of the portions corresponding to the rigid bodies of the bipedal walking body in the absolute coordinate system are determined in terms of resultant accelerations of the accelerations of the centers of gravity with respect to the reference point and the accelerations of the reference point (acceleration in the absolute coordinate system).

Furthermore, angular accelerations of the portions corresponding to the rigid bodies are determined as two-level differential values of tilt angles obtained from time-series data of tilt angles of the portions corresponding to the rigid bodies.

According to the knowledge of the inventors of the present application, positions of application points of floor reaction forces of leg bodies in a bipedal walking body, e.g., positions of application points of floor reaction forces of the leg bodies with respect to ankles of the leg bodies, are closely correlated to tilt angles of thighs of the leg bodies as the portions corresponding to the rigid bodies of the bipedal walking body and bending angles of knee joints of the leg bodies. Therefore, estimated positions of the application points of floor reaction forces in the bipedal walking body can be determined on the basis of at least either the tilt angles of the thighs of the leg bodies or the bending angles of the knee joints.

As described above, when the accelerations of the centers of gravity of the portions corresponding to the rigid bodies of the bipedal walking body, the angular accelerations of the portions corresponding to the rigid bodies, and estimated positions of the application points of the floor reaction forces have been determined, the data, including these values and estimated values of the floor reaction forces determined by the method of estimating floor reactions, can be used to estimate moments acting on knee joints and hip joints of the leg bodies on the basis of a publicly known so-called inverse dynamic model. In short, according to a method based on the inverse dynamic model, moments acting on the joints of a bipedal walking body that correspond to joints of a rigid body link model are determined in order, beginning with one closest to a floor reaction force application point, using an equation of motion related to translational motion of the centers of gravity of the portions corresponding to the rigid bodies of the bipedal walking body and an equation of motion related to rotational motions of the portions corresponding to the rigid bodies (e.g., rotational motions around the centers of gravity of the portions corresponding to the rigid bodies). Although more details will be discussed later, if, for example, each leg body is regarded as a link assembly having a thigh and a crus as portions corresponding to the rigid bodies, then a force (joint reaction force) acting on a knee joint of each leg body can be determined by applying an acceleration of the center of gravity of the crus, an estimated value of a floor reaction force acting on the leg body, and a value of the weight of the crus to the equation of motion related to the translational motion of the center of gravity of the crus of each leg body. Furthermore, a moment of the knee joint of the leg body can be estimated by applying a joint reaction force acting on the knee joint of the leg body, an angular acceleration of the crus of the leg body, an estimated position of the floor reaction force application point of the leg body, an estimated value of the floor reaction force of the leg body, data values related to a position of the center of gravity of the crus in the crus and a size (length) of the crus, a value of an inertial moment of the crus, and a value of a tilt angle of the crus to the equation of motion related to the rotational motion of the crus.

A joint reaction force acting on a hip joint of the leg body can be determined by applying an acceleration of the center of gravity of the thigh, a joint reaction force acting on the knee joint of the leg body, and a value of the weight of the thigh to the equation of motion regarding the translational motion of the center of gravity of the thigh of each leg body. Furthermore, a moment of a hip joint of the leg body can be estimated by applying joint reaction forces acting on the knee joint and the hip joint, respectively, of the leg body, an angular acceleration of the thigh of the leg body, data values related to a position of the center of gravity of the thigh in the thigh and a size (length) of the thigh, a value of an inertial moment of the thigh, and a value of a tilt angle of the thigh to an equation of motion related to a rotational motion of the thigh.

According to the method of estimating joint moments in accordance with the present invention, estimating a moment acting on a joint of a leg body, using an estimated value of a floor reaction force determined by the aforementioned method of estimating floor reactions in accordance with the present invention makes it possible to estimate moments acting on joints of a leg body in real time with relatively high accuracy without the need for attaching relatively large sensors or the like to a bipedal walking body.

BRIEF DESCRIPTION OF THE DRAWINGS

FIG. 15 is a graph illustrating time-dependent changes of an estimated value of a floor reaction force determined in the embodiment of the present invention, and FIG. 16 is a graph illustrating time-dependent changes of estimated values of moments of a knee joint and a hip joint determined by the embodiment of the present invention.

BEST MODE FOR CARRYING OUT THE INVENTION

An embodiment in accordance with the present invention will be explained with reference to the aforesaid FIG. 1 and FIG. 2 to FIG. 12.

The present embodiment is an embodiment to which a method of estimating floor reactions and a method of estimating joint moments in accordance with the present invention have been applied to a human being regarded as a bipedal walking body.

Figure 2:
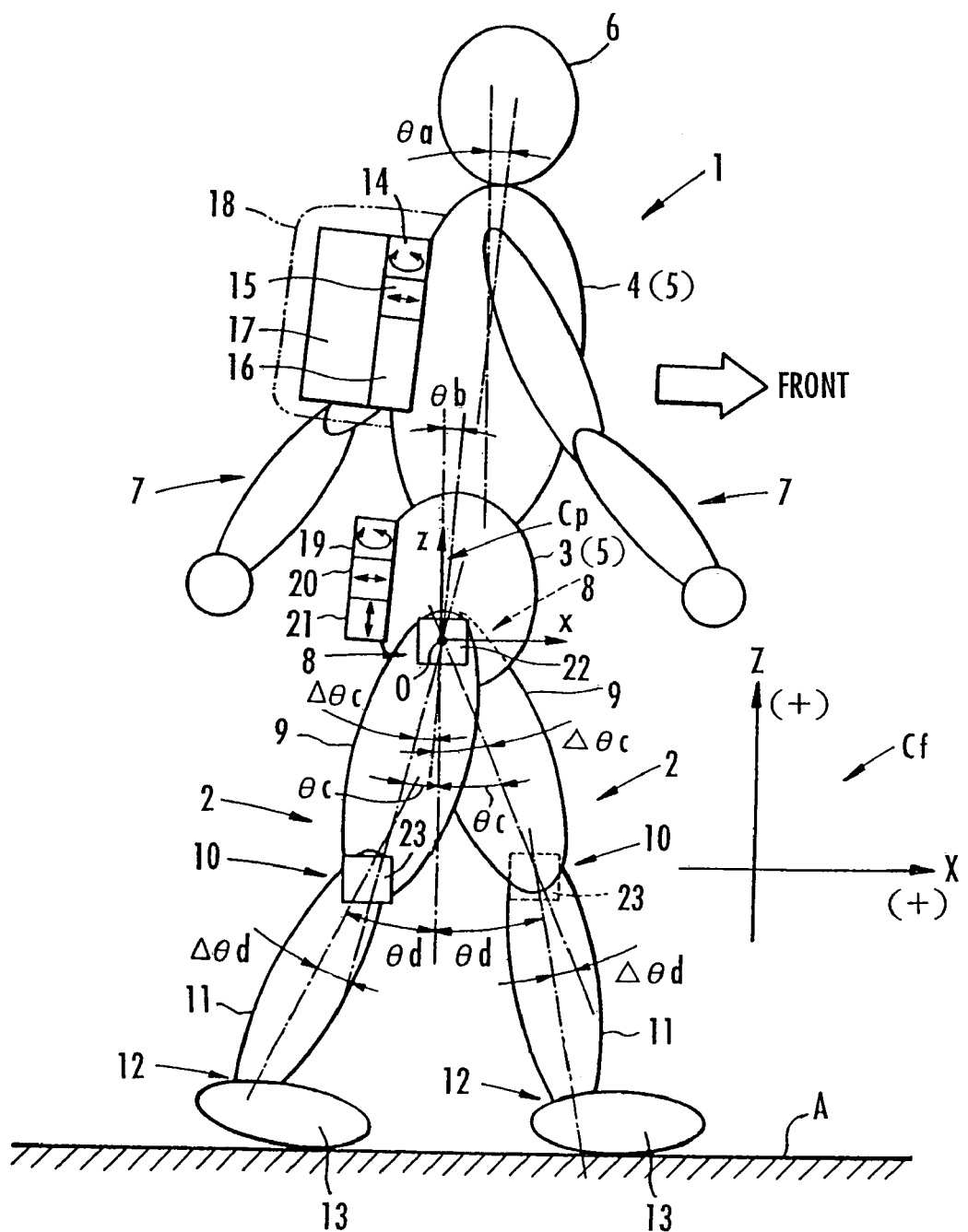
FIG. 2 is a diagram schematically showing a human being regarded as a bipedal walking body and a construction of an apparatus installed on the human being in an embodiment of the present invention.

As schematically shown in FIG. 2, a human being 1 is roughly constructed of a pair of right and left leg bodies 2, 2, a torso 5 formed of a waist 3 and a chest 4, a head 6, and a pair of right and left arms 7, 7. In the torso 5, the waist 3 is connected to the leg bodies 2, 2 through the intermediary of a pair of right and left hip joints 8, 8, and supported on the two leg bodies 2, 2. The chest 4 of the torso 5 is tiltably located on the upper side of the waist 3 toward the front side of the human being 1 in relation to the waist 3. Arms 7, 7 are provided such that they extend from both upper right and left sides of the chest 4, and the head 6 is supported on an upper end portion of the chest 4.

Each of the leg bodies 2, 2 has a thigh 9 extending from the hip joint 8, and a crus 11 extending from a distal end of the thigh 9 via a knee joint 10. A foot portion 13 is connected to a distal end of the crus 11 via an ankle (ankle joint) 12.

According to the present embodiment, an apparatus described below is installed on the human being 1 to estimate floor reaction forces acting on the leg bodies 2 of the human being 1 having such a construction and also to estimate moments acting on the knee joints 10 and the hip joints 8.

Installed to the chest 4 of the torso 5 are a gyro sensor 14 generating outputs based on angular velocities involved in tilts of the chest 4 (hereinafter referred to as "the chest gyro sensor 14"), an accelerometer 15 generating outputs based on accelerations in a longitudinal direction of the chest 4 (hereinafter referred to as "chest longitudinal accelerometer 15"), an arithmetic processing unit 16 constructed of a CPU, RAM, ROM, etc., and a battery 17 providing a power source of the arithmetic processing unit 16, etc. In this case, these chest gyro sensor 14, the chest longitudinal accelerometer 15, the arithmetic processing unit 16, and the battery 17 are housed in an accommodating member 18 shaped like a shoulder bag fixed to, for example, the chest 4 through the intermediary of a belt or the like, which is not shown, so as to be integrally fixed to the chest 4 through the intermediary of the accommodating member 18.

To be more specific, an acceleration indicated by an output of the chest accelerometer 15 is a longitudinal acceleration in the horizontal sectional direction of the chest 4 (direction orthogonal to an axial center of the chest 4). When the human being 1 stands upright on a flat ground, the acceleration is in the longitudinal horizontal direction (direction of an X-axis of the absolute coordinate system shown in FIG. 2). When the waist 3 or the chest 4 is inclined from a vertical direction (direction of a Z-axis of the absolute coordinate system shown in FIG. 2), the acceleration is in a direction inclined with respect to the horizontal direction by a tilt angle with respect to the vertical direction of the chest 4.

Furthermore, a gyro sensor 19 generating outputs based on angular velocities involved in tilts of the waist 3 (hereinafter referred to as "the waist gyro sensor 19"), an accelerometer 20 generating outputs based on accelerations in a longitudinal direction of the waist 3 (hereinafter referred to as "the waist longitudinal accelerometer 20"), and an accelerometer 21 generating outputs based on vertical accelerations of the waist 3 ("hereinafter referred to as the waist vertical accelerometer 21") are integrally installed and fixed to the waist 3 of the torso 5 through the intermediary of a fixing means, such as a belt, which is not shown.

As in the case of the chest longitudinal accelerometer 15, the waist longitudinal accelerometer 20 is, to be more specific, a sensor for detecting longitudinal accelerations in the horizontal sectional direction of the waist 3 (direction orthogonal to an axial center of the waist 3). The waist vertical accelerometer 21 is, to be more specific, a sensor for detecting vertical accelerations in the axial direction of the waist 3 (the vertical accelerations being orthogonal to the accelerations detected by the waist longitudinal accelerometer 20). The waist longitudinal accelerometer 20 and the waist vertical accelerometer 21 may be integrated in the form of a biaxial accelerometer.

The hip joint 8 and the knee joint 10 of each of the leg bodies 2 are provided with a hip joint angle sensor 22 and a knee joint angle sensor 23 that generate outputs based on their bending angles $\Delta\theta c$ and $\Delta\theta d$, respectively. Regarding the hip joint angle sensors 22, only the hip joint angle sensor 22 associated with the hip joint 8 of the leg body 2 on this side (right side, as observed in the forward direction of the human being 1) is shown in FIG. 2. However, another hip joint angle sensor 22 is attached to the hip joint 8 of the leg body 2 on the other side (left side in relation to the forward direction of the human being 1) concentrically to the hip joint angle senor 22 on this side.

These angle sensors 22 and 23 are formed of, for example, potentiometers, and attached to the respective leg bodies 2 through the intermediary of means, such as band members or the like, which are not shown. Here, the bending angles $\Delta\theta c$ detected by the hip joint angle sensors 22 are, to be more specific, rotational angles of the thigh 9 of each leg body 2 around the hip joint 8 (around the axial center of the hip joint 8 in the lateral direction of the human being 1) with respect to the waist 3 on the basis of a reference defined by a predetermined posture relationship between the waist 3 and the thigh 9 of each leg body 2 (e.g., a posture relationship in which an axial center of the waist 3 and an axial center of the thigh 9 are substantially parallel), as in a posture of the human being 1 standing upright). Similarly, the bending angles $\Delta\theta d$ detected by the knee joint angle sensors 23 are rotational angles of the crus 11 around the knee joint 10 with respect to the thigh 9 (around the axial center of the knee joint 10 in the lateral direction of the human being 1) on the basis of a reference defined by a predetermined posture relationship between the thigh 9 and the crus 11 of each leg body 2 (e.g., a posture relationship in which an axial center of the thigh 9 and an axial center of the crus 11 are substantially parallel).

The foregoing sensors 14, 15, and 19 to 23 are connected to the arithmetic processing unit 16 via signal lines, which are not shown, so as to supply their outputs to the arithmetic processing unit 16.

Figure 3:
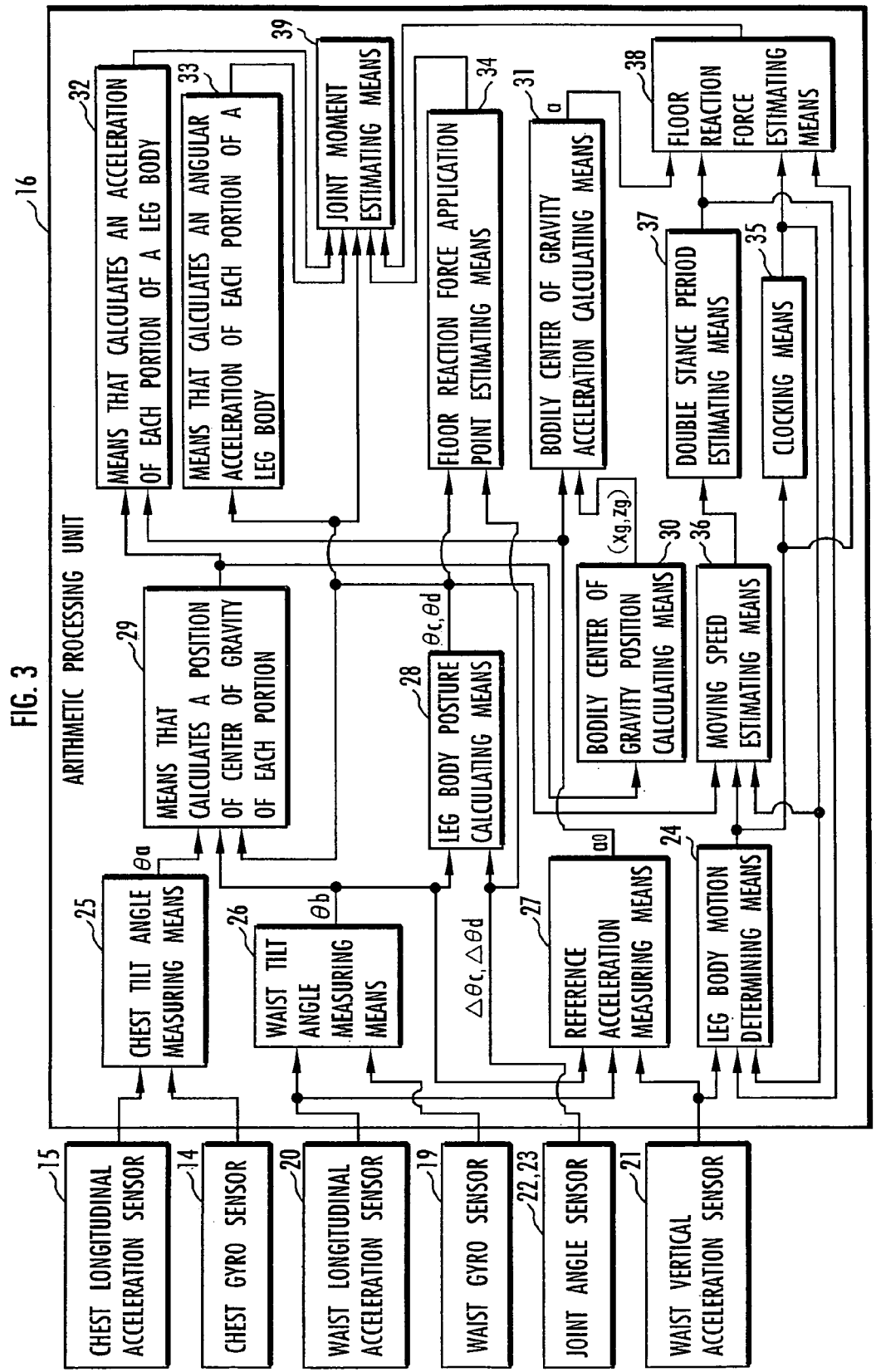
FIG. 3 is a block diagram for explaining functions of an arithmetic processing unit installed in the apparatus shown in FIG. 2.

The arithmetic processing unit 16 is provided with functional means, as shown in FIG. 3. Specifically, the arithmetic processing unit 16 is equipped with a leg body motion determining means 24 that uses data detected by the waist vertical accelerometer 21 and data obtained by a clocking means 35 and a double stance period estimating means 37, respectively, which will be discussed hereinafter, so as to determine whether motion states of the leg bodies 2, 2 of the human being 1 are in the single stance state (the state shown in FIG. 1(a)) or the double stance state (the state shown in FIG. 1(b)). The arithmetic processing unit 16 is further provided with a chest tilt angle measuring means 25 that uses detection data of the chest longitudinal accelerometer 15 and the chest gyro sensor 14 so as to measure a tilt angle $\theta a$ in an absolute coordinate system Cf of the chest 4 (as a specific example, a tilt angle $\theta a$ with respect to a vertical direction; refer to FIG. 2) and a waist tilt angle measuring means 26 that uses detection data of the waist longitudinal accelerometer 20 and the waist gyro sensor 19 so as to measure a tilt angle $\theta b$ in an absolute coordinate system Cf of the waist 3 (as a specific example, a tilt angle $\theta b$ with respect to a vertical direction; refer to FIG. 2).

The arithmetic processing unit 16 is further provided with a reference acceleration measuring means 27 that uses detection data of the waist longitudinal accelerometer 20 and the waist vertical accelerometer 21 and data of the tilt angle $\theta b$ of the waist 3 measured by the waist tilt angle measuring means 26 so as to determine an acceleration (translational acceleration) $a_0 = {}^T(a_{0x}, a_{0z})$ in the absolute coordinate system Cf at an origin O of a bodily coordinate system Cp (xz-coordinate in FIG. 2) set at the waist 3, as shown in FIG. 2, as a reference point of the human being 1 in the present embodiment. Here, the bodily coordinate system Cp is, to be more specific, a coordinate system, for example, that has a midpoint of a line connecting centers of the right and left hip joints 8, 8 of the human being 1 defined as the origin O, a vertical direction being defined as a z-axis direction, and a forward horizontal direction of the human being 1 defined as an x-axis direction (a coordinate system in which the directions of the three axes are the same as those in the aforesaid absolute coordinate system Cf).

The arithmetic processing unit 16 is further provided with a leg body posture calculating means 28 that uses detection data of the hip joint angle sensor 22 and the knee joint angle sensor 23 of each leg body 2 and data of the tilt angle $\theta b$ of the waist 3 by the waist tilt angle measuring means 26 so as to determine tilt angles $\theta c$ and $\theta d$ of the thigh 9 and the crus 11, respectively, of each leg body 2 in an absolute coordinate system Cf (as specific examples, tilt angles $\theta c$ and $\theta d$ with respect to a vertical direction; refer to FIG. 2).

Figure 1:
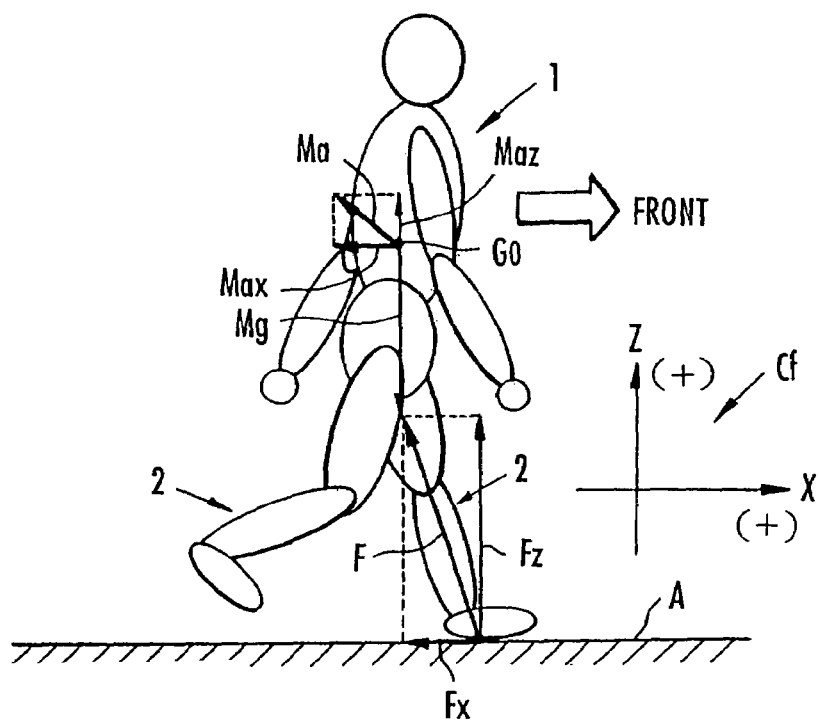
FIG. 1(*a*) and FIG. 1(*b*) are diagrams for explaining a basic principle of a method of estimating floor reactions in accordance with the present invention.
Figure 1:
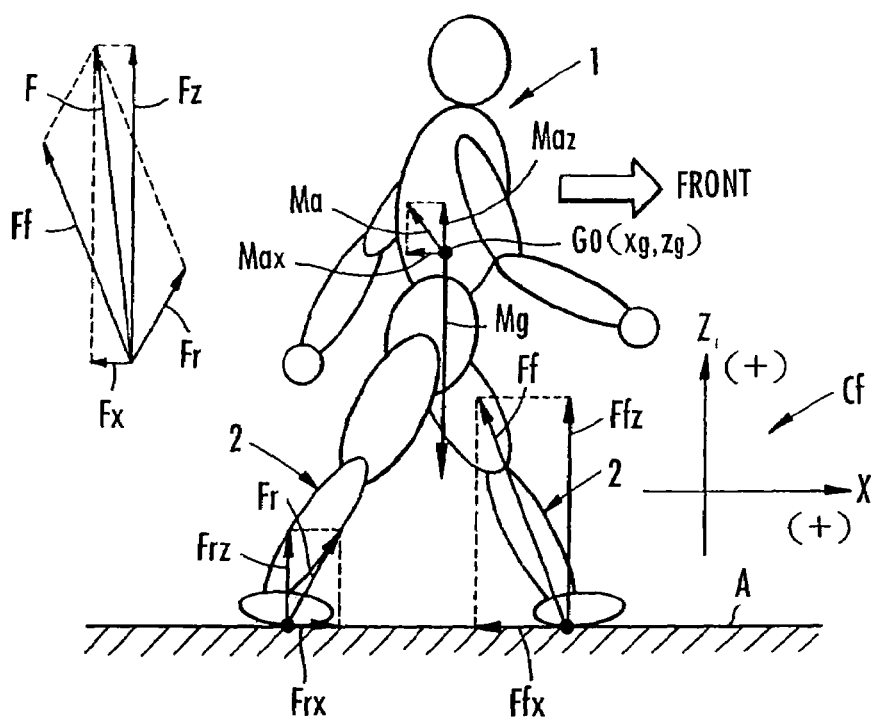

The arithmetic processing unit 16 is further provided with a means 29 that calculates a position of center of gravity of each portion that uses data of a tilt angle $\theta a$ of the chest 4, a tilt angle $\theta b$ of the waist 3, and a tilt angle $\theta c$ of the thigh 9 and a tilt angle $\theta d$ of the crus 11 of each leg body 2, which are obtained by the chest tilt angle measuring means 25, the waist tilt angle measuring means 26, and the leg body posture calculating means 28, to determine positions of the centers of gravity of portions corresponding to the rigid bodies of the human being 1 associated with a rigid body link model to be discussed hereinafter (to be more specific, positions of the centers of gravity of portions corresponding to the rigid bodies in the bodily coordinate system Cp), a bodily center of gravity position calculating means 30 that uses data of positions of centers of gravity of portions corresponding to the rigid bodies so as to determine a position of center of gravity of body G0 of the entire human being 1 in the bodily coordinate system Cp (hereinafter referred to as "the center of gravity of body G0"; refer to FIG. 1), and a bodily center of gravity acceleration calculating means 31 that uses data of the position of the center of gravity of body G0 and data of the acceleration $a_0$ at the origin O of the bodily coordinate system Cp by the reference acceleration measuring means 27 so as to determine an acceleration $a = {}^T(ax, az)$ (refer to FIG. 1) of the center of gravity of body G0 in the absolute coordinate system Cf.

The arithmetic processing unit 16 is further provided with a means 32 that calculates an acceleration of each portion of a leg body that uses data of positions of centers of gravity of portions corresponding to the rigid bodies of the human being 1 (to be more specific, positions of centers of gravity of portions corresponding to the rigid bodies related to the leg bodies 2) by the means 29 that calculates a position of center of gravity of each portion and data of the acceleration $a_0$ at the origin O of the bodily coordinate system Cp by the reference acceleration measuring means 27 so as to determine accelerations (translational accelerations) of centers of gravity of the thigh 9 and the crus 11 of each leg body 2 in the absolute coordinate system Cf, a means 33 that calculates an angular acceleration of each portion of a leg body that uses data of the tilt angles θc and θd of the thigh 9 and the crus 11 of each leg body 2, respectively, by the leg body posture calculating means 28 so as to determine angular accelerations of the thigh 9 and the crus 11 of each leg body 2 in the absolute coordinate system Cf, and a floor reaction force application point estimating means 34 that uses data of the tilt angle θc of the thigh 9 of each leg body 2 by the leg body posture calculating means 28 and a bending angle Δθd of the knee joint 10 measured by the knee joint angle sensor 23 so as to estimate a position of a point of application of a floor reaction force of each leg body 2 in contact with the ground.

The arithmetic processing unit 16 is further provided with a clocking means 35 that clocks time elapsed from a start of a double stance state each time the start of the double stance state (an end of a single stance state) is found by the leg body motion determining means 24, a moving speed estimating means 36 that uses data of the tilt angles θc and θd of the thigh 9 and the crus 11 of each leg body 2, respectively, by the leg body posture calculating means 28 and clocking data of the clocking means 35 so as to estimate a moving speed of the human being 1 each time a start of the double stance state (an end of the single stance state) is found by the leg body motion determining means 24, and a double stance period estimating means 37 for estimating time from a start to an end of the double stance state (duration of the double stance state; hereinafter referred to as "the double stance period") from data of moving speed determined by the moving speed estimating means 36.

The arithmetic processing unit 16 is further equipped with a floor reaction force estimating means 38 that determines an estimated value of a floor reaction force acting on each leg body 2 by using data of the acceleration a of a bodily center of gravity supplied by the bodily center of gravity acceleration calculating means 31, data of an estimated value of a double stance period supplied by the double stance period estimating means 37, clocking data supplied by the clocking means 35, and data of a determination result of a motion state of the leg body 2 supplied by the leg body motion determining means 24, and a joint moment estimating means 39 for estimating moments acting on the knee joint 10 and the hip joint 8 of each leg body 2 by using this data of the estimated value of the floor reaction force, data of accelerations of centers of gravity of the thigh 9 and the crus 11 of each leg body 2 supplied by the means 32 that calculates an acceleration of each portion of a leg body, data of angular accelerations of the thigh 9 and the crus 11 of each leg body 2 supplied by the means 33 that calculates an angular acceleration of each portion of a leg body, data of an estimated position of a point of application of a floor reaction force supplied by the floor reaction force application point estimating means 34, and data of the tilt angles θc and θd of the thigh 9 and the crus 11, respectively, of each leg body 2 supplied by the leg body posture calculating means 28.

An operation of the present embodiment will be explained in combination with more detailed description of processing by each means of the aforementioned arithmetic processing unit 16.

In the present embodiment, when, for example, the human being 1 moves by walking, if a power switch, not shown, of the arithmetic processing unit 16 is turned on while both leg bodies 2 and 2 are in contact with a floor, then processing is sequentially carried out by the arithmetic processing unit 16 at a predetermined cycle time, as explained below, so as to sequentially determine estimated values, etc. acting on each leg body 2.

First, the arithmetic processing unit 16 implements processing by the chest tilt angle measuring means 25 and the waist tilt angle measuring means 26. In this case, the processing by the chest tilt angle measuring means 25 sequentially determines the tilt angle θa of the chest 4 in the absolute coordinate system Cf at each cycle time mentioned above by a publicly known technique based on the so-called Kalman filter processing, using longitudinal accelerations of the chest 4 received from the chest longitudinal accelerometer 15 and the chest gyro sensor 14, and detection data of an angular velocity of the chest 4. Similarly, the processing by the waist tilt angle measuring means 26 sequentially determines the tilt angle θb of the waist 3 in the absolute coordinate system Cf by the Kalman filter processing, using longitudinal accelerations of the waist 3 received from the waist longitudinal accelerometer 20 and the waist gyro sensor 19, and detection data of an angular velocity of the waist 3. Here, the tilt angles θa and θb of the chest 4 and the waist 3, respectively, in the absolute coordinate system Cf denote tilt angles with respect to, for example, a vertical direction (gravitational direction) in the present embodiment.

The tilt angles of the chest 4 and the waist 3 can be alternatively determined by, for example, integrating detection data of angular velocities obtained by the gyro sensors 14 and 19. However, performing the Kalman filter processing, as in the present embodiment, allows the tilt angles θa and θb of the chest 4 and the waist 3 to be measured with high accuracy.

Next, the arithmetic processing unit 16 performs processing by the leg body posture calculating means 28 and processing by the reference acceleration measuring means 27.

In the processing implemented by the leg body posture calculating means 28, the tilt angles θc and θd (tilt angles with respect to the vertical direction; refer to FIG. 2) of the thigh 9 and the crus 11 of each leg body 2 in the absolute coordinate system Cf are determined at each cycle time, as described below. The tilt angle θc of the thigh 9 of each leg body 2 is calculated according to expression (4) given below on the basis of a current value of detection data of the bending angle Δθc of the hip joint 8 supplied by the hip joint angle sensor 22 attached to the leg body 2 and a current value of the tilt angle θb of the waist 3 determined by the waist tilt angle measuring means 25:

$$\theta c = \theta b + \Delta \theta c \qquad (4)$$

where the tilt angle θb of the waist 3 takes a negative value if the waist 3 tilts with respect to the vertical direction such that an upper end portion of the waist 3 juts out farther to the front side of the human being 1 than a lower end portion thereof; and the bending angle Δθc of the hip joint 8 takes a positive value if the thigh 9 tilts with respect to the axial center of the waist 3 such that a lower end portion of the thigh 9 juts out toward the front side of the human being 1.

Furthermore, the tilt angle θd of the crus 11 of each leg body 2 is calculated according to expression (5) given below on the basis of a current value of the tilt angle θc of the thigh 9 determined as described above and a current value of detection data of the bending angle Δθd of the knee joint 10 supplied by the knee joint angle sensor 23 attached to the leg body 2:

$$\theta d = \theta c - \Delta\theta d \quad (5)$$

where the bending angle of the knee joint 10 takes a positive value if the crus 11 tilts toward the rear side of the thigh 9 with respect to the axial center of the thigh 9.

In the processing by the reference acceleration measuring means 27, the acceleration $a_0 = {}^T(a_0x, a_0z)$ in the absolute coordinate system Cf of the origin O of the bodily coordinate system Cp is determined as described below. If a current value of detection data of a longitudinal acceleration of the waist 3 supplied by the waist longitudinal accelerometer 20 is denoted as ap, and a current value of detection data of a vertical acceleration of the waist 3 supplied by the waist vertical accelerometer 21 is denoted as aq, then the acceleration $a_0 = {}^T(a_0x, a_0z)$ in the absolute coordinate system Cf is determined according to expression (6) given below from the detection data ap and aq and a current value of the tilt angle θb of the waist 3 obtained by the waist tilt angle measuring means 26:

$$a_0 = {}^T(a_0x, a_0z) \quad (6)$$
$$= {}^T(ap \cdot \cos\theta b - aq \cdot \sin\theta b, \ ap \cdot \sin\theta b + aq \cdot \cos\theta b)$$

The arithmetic processing unit 16 then carries out processing by the means 29 that calculates a position of center of gravity of each portion to determine a position of center of gravity of each portion corresponding to a rigid body of the human being 1 in the bodily coordinate system Cp (a position with respect to the origin O of the bodily coordinate system Cp), using a rigid body link model explained below.

Figure 4:
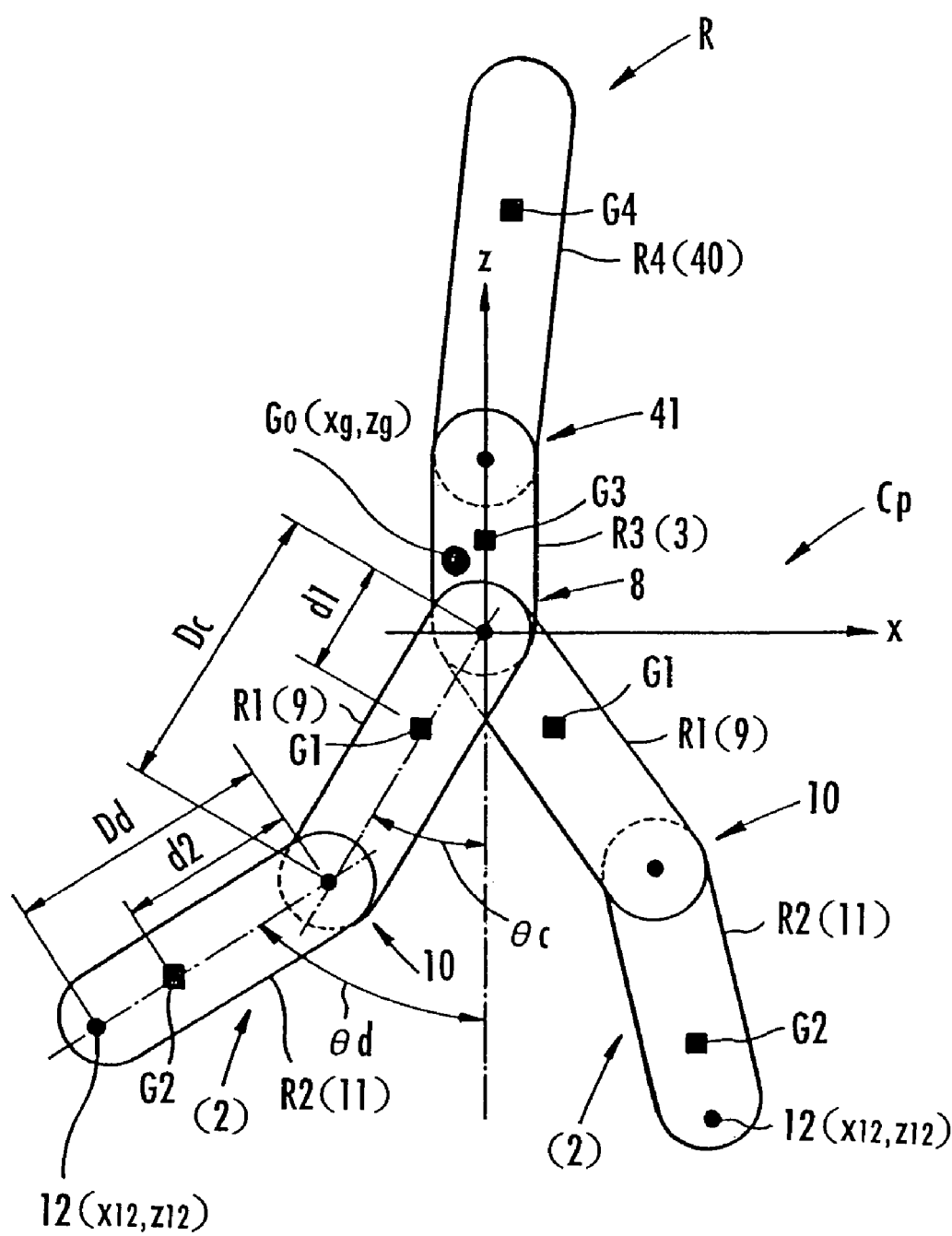
FIG. 4 is a diagram showing a rigid body link model used for processing performed by the arithmetic processing unit shown in FIG. 3.

As shown in FIG. 4, a rigid body link model R used in the present embodiment is a model representing the human being 1 by connecting rigid bodies R1 and R1 corresponding to the thighs 9 of the respective leg bodies 2, rigid bodies R2 and R2 corresponding to the cruses 11, the rigid body R3 corresponding to the waist 3, and a rigid body R4 corresponding to a portion 40 combining the chest 4, the arms 7 and 7, and the head 6 (hereinafter referred to as a "body 40"). In this case, a connection of the rigid bodies R1 and the rigid body R3 and a connection of the rigid bodies R1 and the rigid bodies R2 correspond to the hip joint 8 and a knee joint 10, respectively. A connection of the rigid body R3 and the rigid body R4 provides a tilt supporting point 41 of the chest 4 with respect to the waist 3.

In the present embodiment, positions of centers of gravity G1, G2, G3 and G4 of portions corresponding to the rigid bodies (the thighs 9 and the cruses 11 of the respective leg bodies 2, the waist 3, and the body 40) of the human being 1 associated with the rigid bodies R1 to R4 of the rigid body link model R in the respective portions corresponding to the rigid bodies are determined in advance and stored in a memory, not shown, of the arithmetic processing unit 16.

The positions of the centers of gravity G1, G2, G3 and G4 of the portions corresponding to the rigid bodies that have been stored and retained in the arithmetic processing unit 16 are positions in a coordinate system that are fixed for the portions corresponding to the rigid bodies. In this case, as examples of data indicating the positions of the centers of gravity G1, G2, G3 and G4 of the portions corresponding to the rigid bodies, distances in axial directions of the respective portions corresponding to the rigid bodies from midpoints of joints at one end of each of the respective portions corresponding to the rigid bodies are used. More specifically, for example, the position of the center of gravity G1 of each thigh 9 is indicated as a position at a distance d1 in the axial direction of the thigh 9 from a center of the hip joint 8 of the thigh 9, the position of the center of gravity G2 of each crus 11 is indicated as a position at a distance d2 in the axial direction of the crus 11 from a center of the knee joint 10 of the crus 11, as shown in FIG. 4. The values of the distances d1 and d2 are determined in advance and stored and retained in the arithmetic processing unit 16. The same applies to the positions of the centers of gravity G3 and G4 of other portions corresponding to the rigid bodies.

To be more precise, the position of the center of gravity G4 of the body 40 is subject to influences of motions of the arms 7 and 7 included in the body 40. In a walking mode, the arms 7 and 7 are in general positionally symmetrical with respect to an axial center of the chest 4, so that the position of the center of gravity G4 of the body 40 hardly changes, and is substantially the same as the position of the center of gravity G4 of the body 40 in, for example, an upright posture.

According to the present embodiment, in addition to the data indicating the positions of the centers of gravity G1, G2, G3 and G4 of the portions corresponding to the rigid bodies (the thighs 9 and the cruses 11 of the leg bodies 2, the waist 3, and the body 40), data of weights of the portions corresponding to the rigid bodies and data of sizes of the portions corresponding to the rigid bodies (e.g., data of lengths of the portions corresponding to the rigid bodies) are determined in advance and stored and retained in the arithmetic processing unit 16.

The weight of the crus 11 includes the weight of the foot portion 13. As described above, data to be stored and retained in the arithmetic processing unit 16 beforehand may be determined by actual measurement or the like, or may be estimated on the basis of human average statistic data from height and weight of the human being 1. Generally, the positions of the centers of gravity G1, G2, G3 and G4, the weights and sizes of the portions corresponding to the rigid bodies are correlated with the height and weight of the human being. Based on the correlation data and from the height and weight of the human being, the positions of the centers of gravity G1, G2, G3 and G4, the weights, and sizes of the portions corresponding to the rigid bodies can be estimated with relatively high accuracy.

The means 29 that calculates a position of center of gravity of each portion uses the data stored and retained beforehand in the arithmetic processing unit 16, as described above, current values of the tilt angle θa of the chest 4 (=tilt angle of the body 40) and the tilt angle θb of the waist 3 determined by the chest tilt angle measuring means 25 and the waist tilt angle measuring means 26, respectively, and current values of the tilt angles θc and θd of the thigh 9 and the crus 11 of each leg body 2, respectively, determined by the leg body posture calculating means 28 so as to determine the positions of the centers of gravity G1, G2, G3 and G4 of the portions corresponding to the rigid bodies in the bodily coordinate system Cp (the xz coordinate shown in FIG. 4) having the origin O fixed at the waist 3.

In this case, since the tilt angles θa to θd of the portions corresponding to the rigid bodies (the thighs 9 and the cruses 11 of the leg bodies 2, the waist 3, and the body 40) have been determined, as described above, positions and postures of the portions corresponding to the rigid bodies in the bodily coordinate system Cp are obtained from data of the foregoing tilt angles θa to θd and data of the sizes of the portions corresponding to the rigid bodies. Thus, the positions of the centers of gravity G1, G2, G3 and G4 of the portions corresponding to the rigid bodies in the bodily coordinate system Cp can be determined.

To be more specific, referring to, for example, FIG. 4, regarding the leg body 2 positioned on the left side in FIG. 4 (the leg body 2 located at the rear in relation to the direction of travel of the human being 1), a tilt angle of the thigh 9 in the bodily coordinate system Cp (a tilt angle with respect to the z-axis direction) is θc (in this case, θc<0 in FIG. 4). Hence, the coordinate of the position of the center of gravity G1 of the thigh 9 in the bodily coordinate system Cp is (d1·sin θc, −d1·cos θc). The tilt angle in the bodily coordinate system Cp of the crus 11 is θd (θd<0 in FIG. 4); therefore, if the length of the thigh 9 is denoted by Dc, then the coordinate of the position of the center of gravity G2 of the crus 11 in the bodily coordinate system Cp will be (Dc·sin θc+d2·sin θd, −Dc·cos θc·d2·cos θd). The centers of gravity of the thigh 9 and the crus 11 of the other leg body 2, and of the waist 3 and the body 38 are determined in the same manner as described above.

After determining the positions of the centers of gravity G1, G2, G3 and G4 of the portions corresponding to the rigid bodies in the bodily coordinate system Cp by the means 29 that calculates a position of center of gravity of each portion, the arithmetic processing unit 16 executes the processing by the bodily center of gravity position calculating means 30 to determine a position (xg, zg) of the center of gravity of body G0 of the human being 1 in the bodily coordinate system Cp, using data of the positions of the centers of gravity G1, G2, G3 and G4 of the portions corresponding to the rigid bodies and data of the weights of the portions corresponding to the rigid bodies.

If the position of the center of gravity G3 and the weight of the waist 3 in the bodily coordinate system Cp are denoted by (x3, z3) and m3, respectively, the position of the center of gravity G4 and the weight of the body 40 are denoted by (x4, z4) and m4, respectively, the position of the center of gravity G1 and the weight of the thigh 9 of the leg body 2, which is located at left in relation to the traveling direction, of the human being 1 are denoted by (x1L, z1L) and m1L, respectively, the position of the center of gravity G2 and the weight of the crus 11 of the leg body 2 are denoted by (x2L, z2L) and m2L, respectively, the position of the center of gravity G1 and the weight of the thigh 9 of the leg body 2 at right are denoted by (x1R, z1R) and m1R, respectively, the position of the center of gravity G2 and the weight of the crus 11 of the leg body 2 are denoted by (x2R, z2R) and m2R, respectively, and the weight of the human being 1 is denoted by M (=m1L+m2L+m1R+m2R+m3+m4), then the position (xg, zg) of the center of gravity of body of the human being 1 in the bodily coordinate system Cp is determined by expression (7) given below:

$$xg=(m1L\cdot x1L+m1R\cdot x1R+m2L\cdot x2L+m2R\cdot x2R+m3\cdot x3+m4\cdot x4)/M$$

$$zg=(m1L\cdot z1L+m1R\cdot z1R+m2L\cdot z2L+m2R\cdot z2R+m3\cdot z3+m4\cdot z4)/M \qquad (7)$$

After carrying out the processing by the bodily center of gravity position calculating means 30, the arithmetic processing unit 16 further carries out the processing by the bodily center of gravity acceleration calculating means 31. In the processing by the bodily center of gravity acceleration calculating means 31, first, a two-level differential value of a position (xg, zg) of the center of gravity of body G0 with respect to the origin O of the bodily coordinate system Cp, that is, an acceleration $^T(d^2xg/dt^2, d^2zg/dt^2)$ of the center of gravity of body G0 in the bodily coordinate system Cp is determined, using time-series data of the position (xg, zg) of the center of gravity of body G0 in the bodily coordinate system Cp obtained by the bodily center of gravity position calculating means 30 for each cycle time mentioned above. Then, a vector sum of the acceleration $^T(d^2xg/dt^2, d^2zg/dt^2)$ and the acceleration $a_0=^T(a_0x, a_0z)$ in the absolute coordinate system Cf of the origin O of the bodily coordinate system Cp determined by the reference acceleration measuring means 27 so as to determine an acceleration $a=^T(ax, az)$ of the center of gravity of body G0 in the absolute coordinate system Cf.

After carrying out the processing by the leg body posture calculating means 28 and the means 29 that calculates a position of center of gravity of each portion, the arithmetic processing unit 16 further carries out the processing by the means 32 that calculates an acceleration of each portion of a leg body, the means 33 that calculates an angular acceleration of each portion of a leg body, and the floor reaction force application point estimating means 34.

In this case, as in the processing by the bodily center of gravity acceleration calculating means 31, the processing by the means 32 that calculates an acceleration of each portion of a leg body first uses time-series data of the positions of the centers of gravity G1 and G2 of the thigh 9 and the crus 11, respectively, which are portions corresponding to the rigid bodies of each leg body 2 in the bodily coordinate system Cp determined by the means 29 that calculates a position of center of gravity of each portion for each cycle time mentioned above thereby to determine two-level differential values of the positions of the centers of gravity G1 and G2 of the thigh 9 and the crus 11, respectively, in the bodily coordinate system Cp, that is, accelerations of the centers of gravity G1 and G2 of the thigh 9 and the crus 11, respectively, in the bodily coordinate system Cp (translational accelerations with respect to the origin O of the bodily coordinate system Cp). Then, a vector sum of the respective accelerations and the acceleration $a_0=^T(a_0x, a_0z)$ in the absolute coordinate system Cf of the origin O of the bodily coordinate system Cp determined by the reference acceleration measuring means 27 so as to determine accelerations of the thigh 9 and the crus 11, respectively, in the absolute coordinate system Cf (more specifically, coordinate components of the accelerations in the absolute coordinate system Cf).

Furthermore, in the processing by the means 33 that calculates an angular acceleration of each portion of a leg body, time-series data of the tilt angles θc and θd of the thigh 9 and the crus 11, respectively, of each leg body 2 obtained by the leg body posture calculating means 28 for each cycle time is used to determine two-level differential values of the tilt angles θc and θd of the thigh 9 and the crus 11, respectively, that is, angular accelerations of the thigh 9 and the crus 11, respectively.

In the processing by the floor reaction force application point estimating means 34, regarding the leg body 2 in contact with the ground, a vector (a positional vector of a point of a floor reaction force applied to the ankle 12; the vector will be hereinafter referred to as the "floor reaction force application point vector") to an floor reaction force application point of the foot portion 13 of the leg body 2 from the ankle 12 of the leg body 2 (a point where it can be regarded that all floor reaction forces acting on a location where the foot portion 13 is in contact with the ground are concentrated) is determined as data indicating the position of the application point of the floor reaction force on the basis of the pre-established correlations shown in FIG. 5 and FIG. 6 from, for example, a current value of the tilt angle $\theta c$ of the thigh 9 calculated by the leg body posture calculating means 28.

More specifically, according to knowledge of the inventors of the present application, a tilt angle $\theta c$ of the thigh 9 of the leg body 2 in contact with the ground and the bending angle $\Delta\theta d$ of the knee joint 10 have a relatively marked correlation with a floor reaction force application point. For instance, the floor reaction force application point vector, more specifically, a component of the floor reaction force application point vector in the direction of travel (the x-axis direction) of the human being 1 and a component of the floor reaction force application point vector in the vertical direction (the z-axis direction) vary with respect to the tilt angle $\theta c$ of the thigh 9, as illustrated in FIG. 5 and FIG. 6. Here, a negative tilt angle $\theta c$ of the thigh 9 is an angle obtained when the thigh 9 tilts with respect to the axial center of the waist 3 such that the leg body 2 extends to the rear side of the human being 1 (e.g., the right leg body 2, as observed in the forward direction of the human being 1 shown in FIG. 2). A positive tilt angle $\theta c$ is an angle obtained when the thigh 9 tilts with respect to the axial center of the waist 3 such that the leg body 2 is on the front side of the human being 1 (e.g., the left leg body 2 in relation to the direction of travel of the human being 1 shown in FIG. 2).

Figure 5:
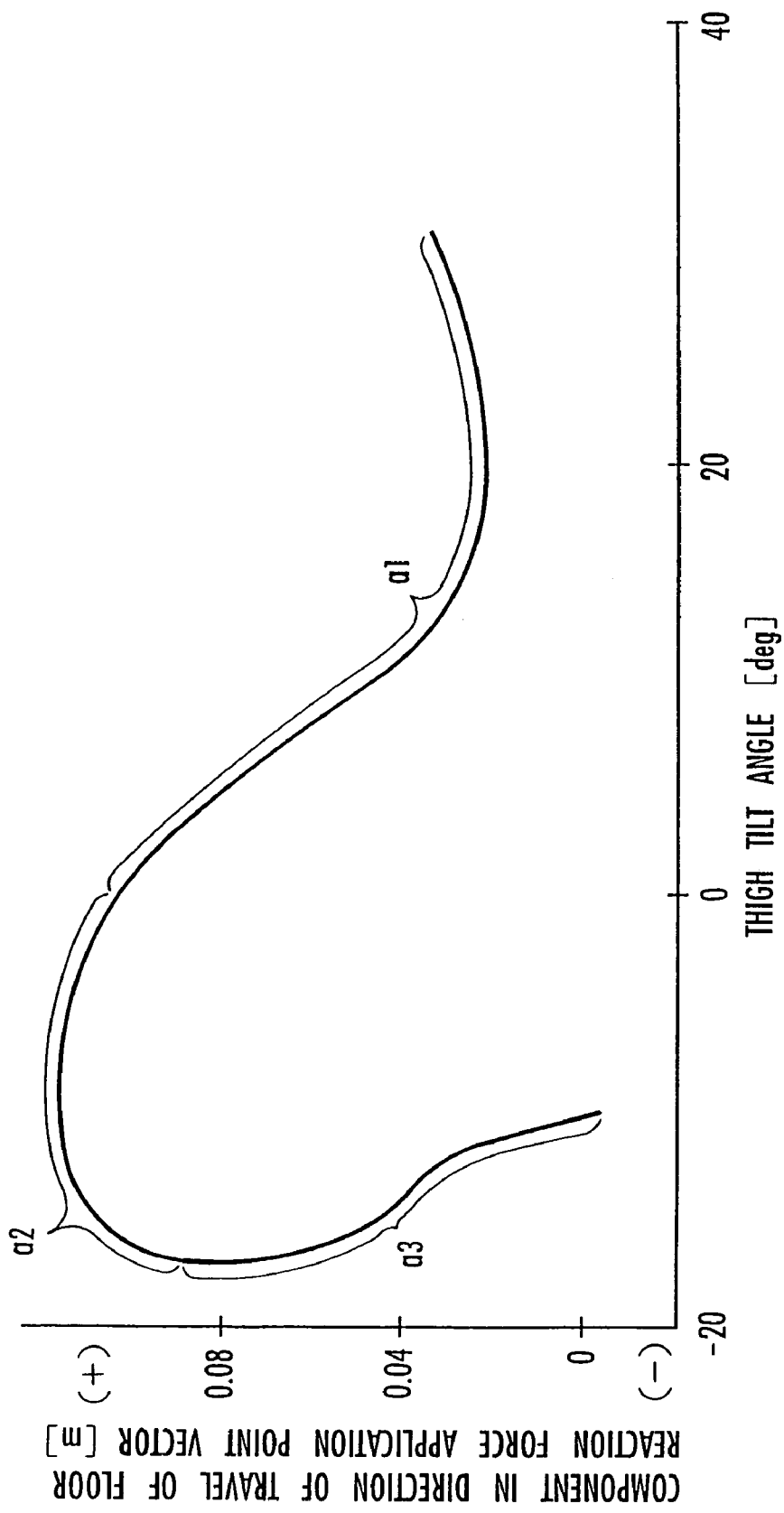
FIG. 5 is a chart illustrating a correlation between a component in a direction of movement of a vector of a floor reaction force application point and a tilt angle of a thigh during normal walk.
Figure 6:
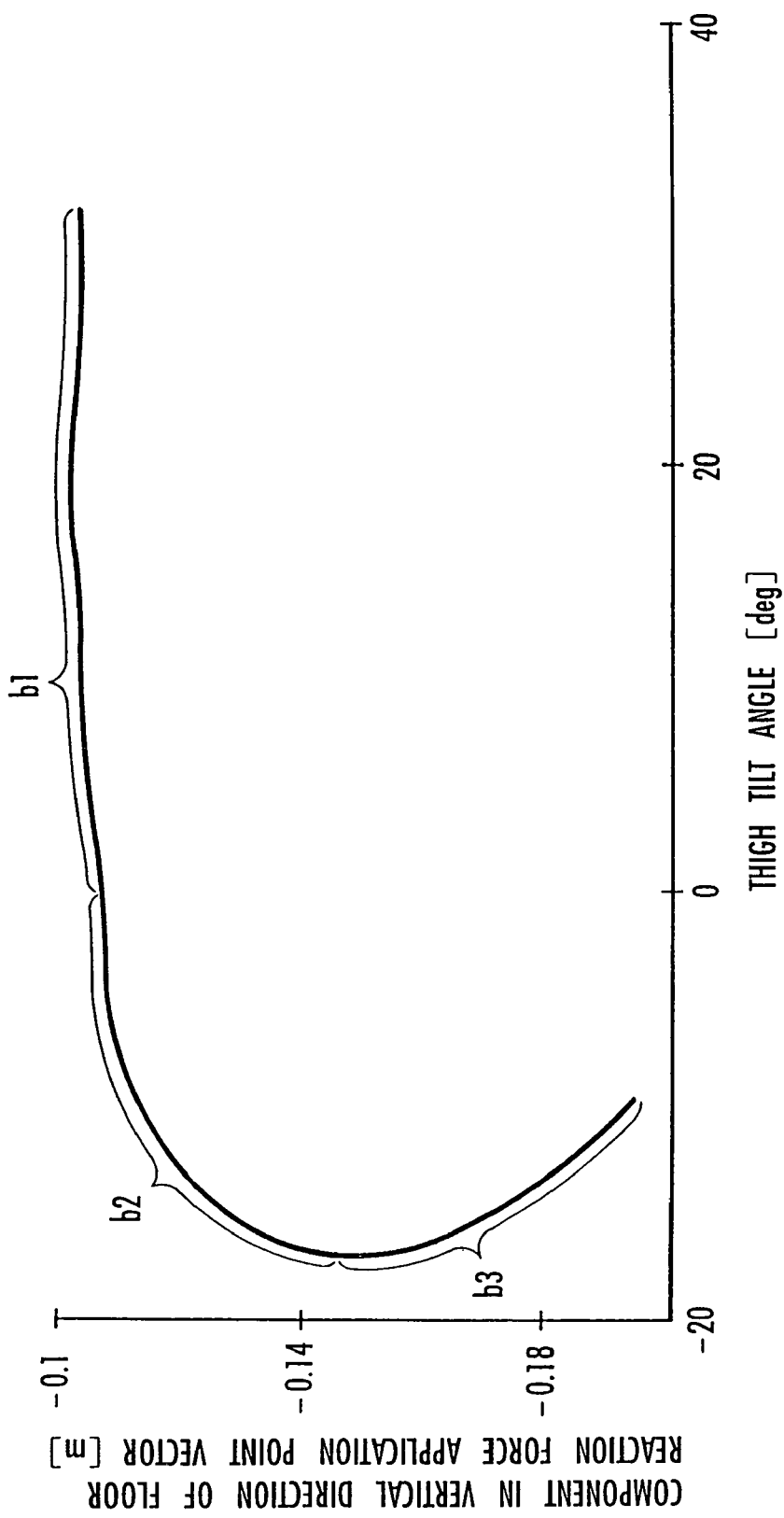
FIG. 6 is a chart illustrating a correlation between a component in a vertical direction of the vector of the floor reaction force application point and the tilt angle of the thigh during normal walk.

According to the present embodiment, an approximate expression that represents the correlations shown in FIG. 5 and FIG. 6 and uses the tilt angle $\theta c$ of the thigh 9 as a parameter is prepared, and the approximate expression is stored and retained in the arithmetic processing unit 16 beforehand. In the processing by the floor reaction force application point estimating means 34, a current value of the tilt angle $\theta c$ of the thigh 9 obtained by the leg body posture calculating means 28 is substituted into the approximate expression thereby to determine the floor reaction force application point vector (to be more specific, the components in the x-axis direction and the z-axis direction of the floor reaction force application point vector).

As shown in FIG. 5 and FIG. 6, in the correlation wherein the tilt angle $\theta c$ of the thigh 9 has an extremely small value, the value of the floor reaction force application point vector differs between a reducing process and an increasing process of the tilt angle $\theta c$ even when the tilt angle $\theta c$ of the thigh 9 remains the same. For this reason, according to the present embodiment, to prepare the aforementioned approximate expression, a transition of the correlation from the moment the heel of the foot portion 13 touches a floor to the moment a toe leaves the floor is divided into a first phase in which the tilt angle $\theta c$ of the thigh 9 is positive (a phase indicated by a1 in FIG. 5 or a phase b1 in FIG. 6), a second phase in which the tilt angle $\theta c$ of the thigh 9 is negative and a changing speed of the tilt angle $\theta c$ of the thigh 9, i.e., the tilt angular velocity of the thigh 9, is negative (a phase indicated by a2 in FIG. 5 or a phase indicated by b2 in FIG. 6), and a third phase in which the tilt angle $\theta c$ of the thigh 9 is negative and the tilt angular velocity of the thigh 9 is positive (a phase indicated by a3 in FIG. 5 or a phase indicated by b3 in FIG. 6), and the respective phases are approximated on the component in the x-axis direction and the component in the z-axis direction, respectively, of the floor reaction force application point vector, using the same function or different functions. An approximate expression for a phase that combines the first and second phases a1 and a2, respectively, in the correlation shown in FIG. 5 is represented by, for example, a sixth-order polynomial functions ($x_1$ to $X_7$ take constant values) given below when the component in the x-axis direction of the floor reaction force application point vector is denoted by Px:

$$Px = x_1 \cdot \theta c^6 + x_2 \cdot \theta c^5 + x_3 \cdot \theta c^4 + x_4 \cdot \theta c^3 + x_5 \cdot \theta c^2 + x_6 \cdot \theta c + x_7$$

An approximate expression for the third phase a3 in the correlation of FIG. 5 is represented by, for example, a fourth-order polynomial functions ($x_8$ to $x_{12}$ take constant values) as shown below:

$$Px = x_8 \cdot \theta c^4 + x_9 \cdot \theta c^3 + X_{10} \cdot \theta c^2 + x_{11} \cdot \theta c + x_{12}$$

An approximate expression for a phase that combines the first and second phases b1 and b2, respectively, in the correlation shown in FIG. 6 is represented by, for example, a sixth-order polynomial functions ($z_1$ to $z_7$ take constant values) given below when the component in the z-axis direction of the floor reaction force application point vector is denoted by Pz:

$$Pz = z_1 \cdot \theta c^6 + z_2 \cdot \theta c^5 + z_3 \cdot \theta c^4 + z_4 \cdot \theta c^3 + z_5 \cdot \theta c^2 + z_6 \cdot \theta c + z_7$$

An approximate expression for the third phase b3 in the correlation of FIG. 6 is represented by, for example, a third-order polynomial functions ($z_8$ to $z_{11}$ take constant values) as shown below:

$$Pz = z_8 \cdot \theta c^3 + z_9 \cdot \theta c^2 + Z_{10} \cdot \theta c + z_{11}$$

When determining a floor reaction force application point vector, it is identified whether the tilt angle $\theta c$ of the thigh 9 is positive or negative and also identified whether the tilt angular velocity of the thigh 9 calculated by one-level differentiation of time-series data of the tilt angle $\theta c$ of the thigh 9 is positive or negative. Furthermore, it is decided which phase is currently in on the basis of the positive or negative tilt angle $\theta c$ and the positive or negative tilt angular velocity, which have been identified, and a current value of the tilt angle $\theta c$ of the thigh 9 is substituted into the approximate equation for the identified phase so as to calculate the floor reaction force application point vector. This makes it possible to calculate, distinguishing between a value of the floor reaction force application point vector in the reducing process of the tilt angle $\theta c$ of the thigh 9 and a value of the floor reaction force application point vector in the increasing process.

In the present embodiment, the correlation between the tilt angle $\theta c$ of the thigh 9 of the leg body 2 and the floor reaction force application point vector is approximated using polynomial equations to determine floor reaction force application point vectors. Alternatively, however, it is possible to store and retain the correlations shown in FIG. 5 and FIG. 6 beforehand in terms of data tables so as to determine floor reaction force application point vectors from the tilt angle $\theta c$ of the thigh 9, using the data tables.

The positions of floor reaction force application points are also correlated to the bending angles of the knee joint 10 of the leg body 2 in contact with the ground, so that a position of a floor reaction force application point may alternatively be estimated from the bending angle $\Delta\theta d$ of the knee joint 10 measured by the knee joint angle sensor 23, in place of the tilt angle $\theta c$ of the thigh 9. As another alternative, a position of a floor reaction force application point may be estimated by a map or the like, using both the tilt angle $\theta c$ of the thigh 9 and the bending angle $\Delta\theta d$ of the knee joint 10.

Figure 7:
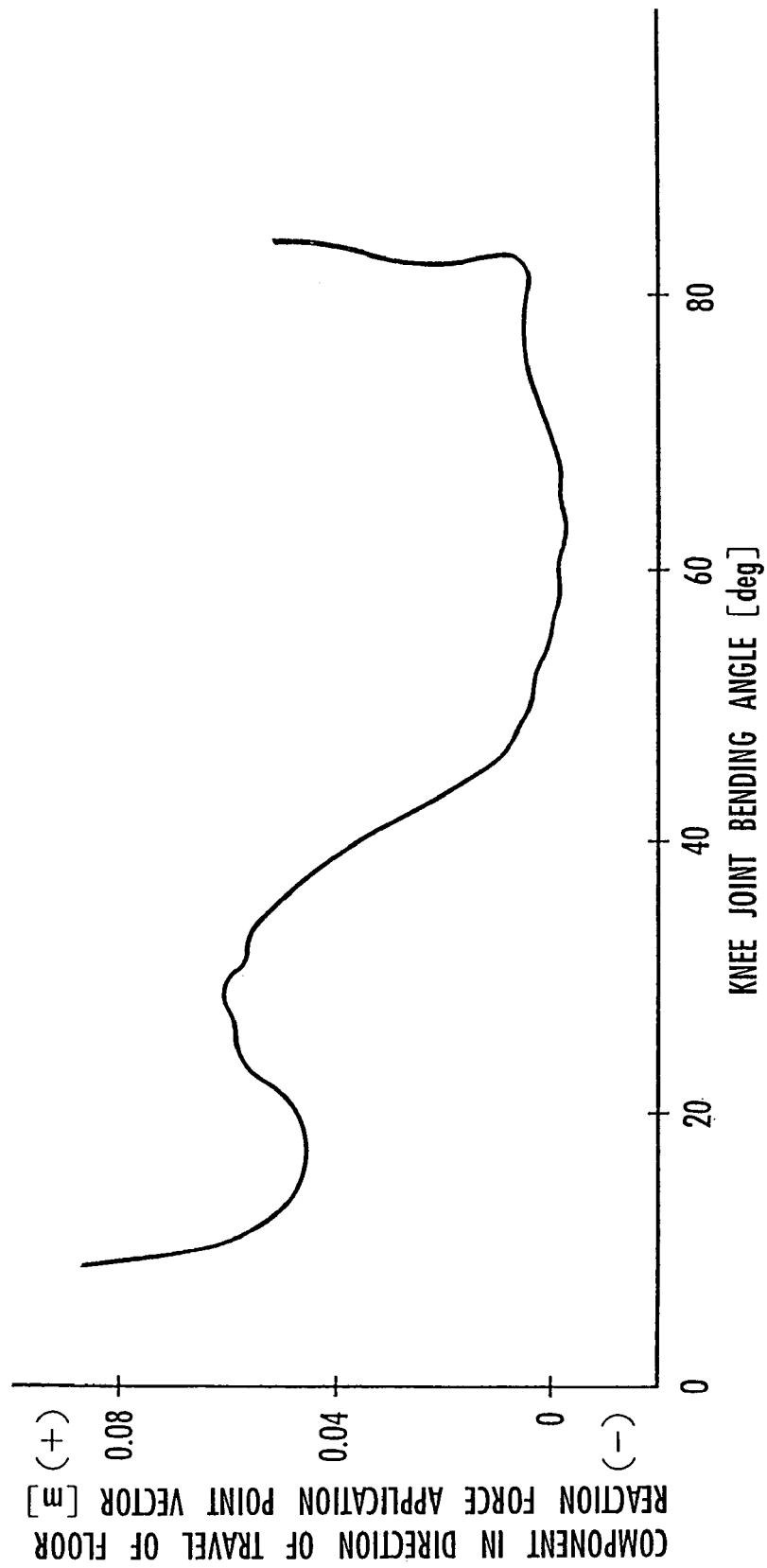
FIG. 7 is a chart illustrating a correlation between a component in the direction of movement of the vector of a floor reaction force application point and the bending angle of a knee joint when sitting on a chair.
Figure 8:
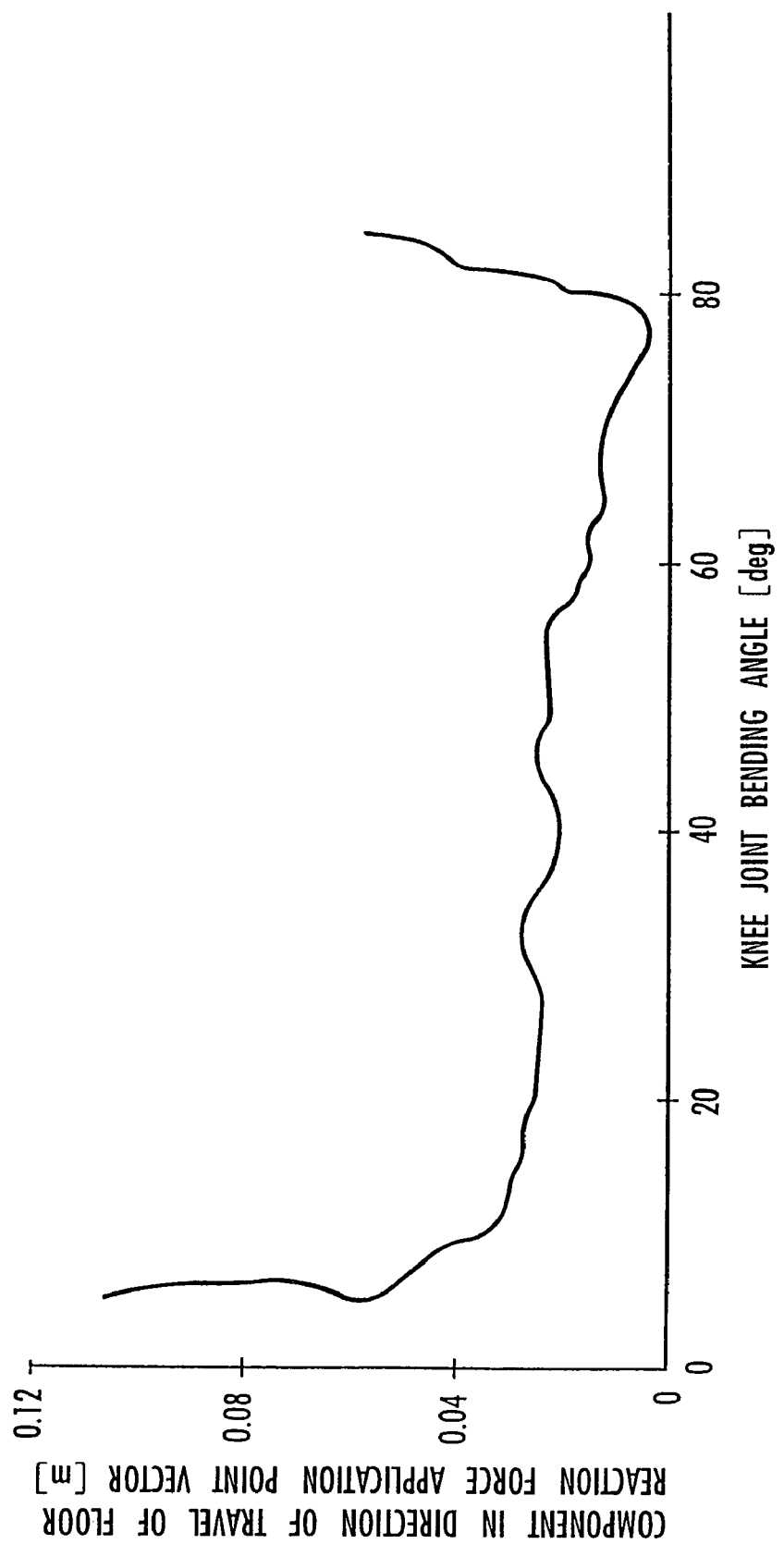
FIG. 8 is a chart illustrating a correlation between a component in the direction of movement of the vector of a floor reaction force application point and the bending angle of the knee joint when standing up from a chair.
Figure 9:
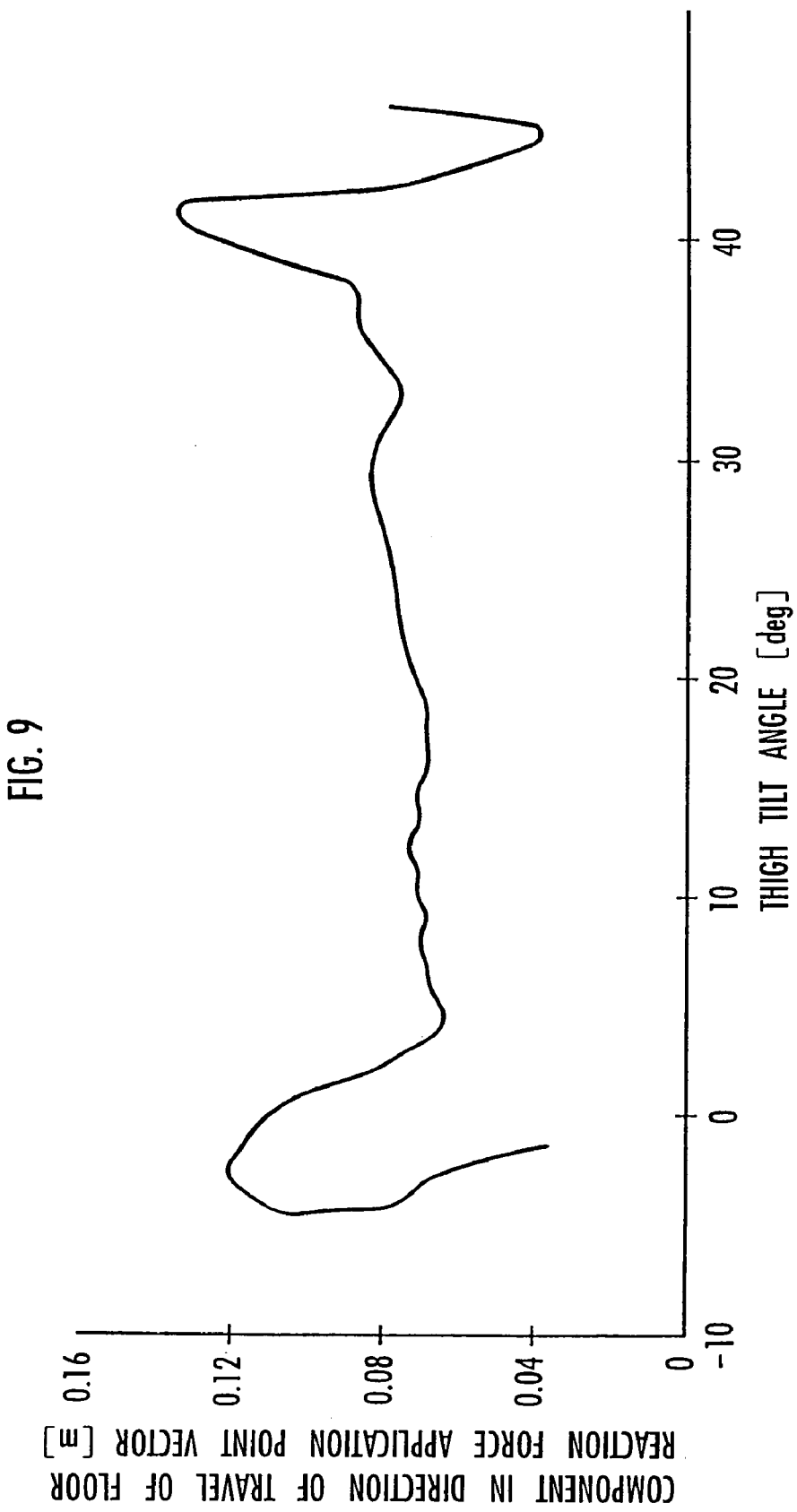
FIG. 9 is a chart illustrating a correlation between a component in the direction of movement of a vector of the floor reaction force application point and a tilt angle of a thigh when climbing stairs.
Figure 10:
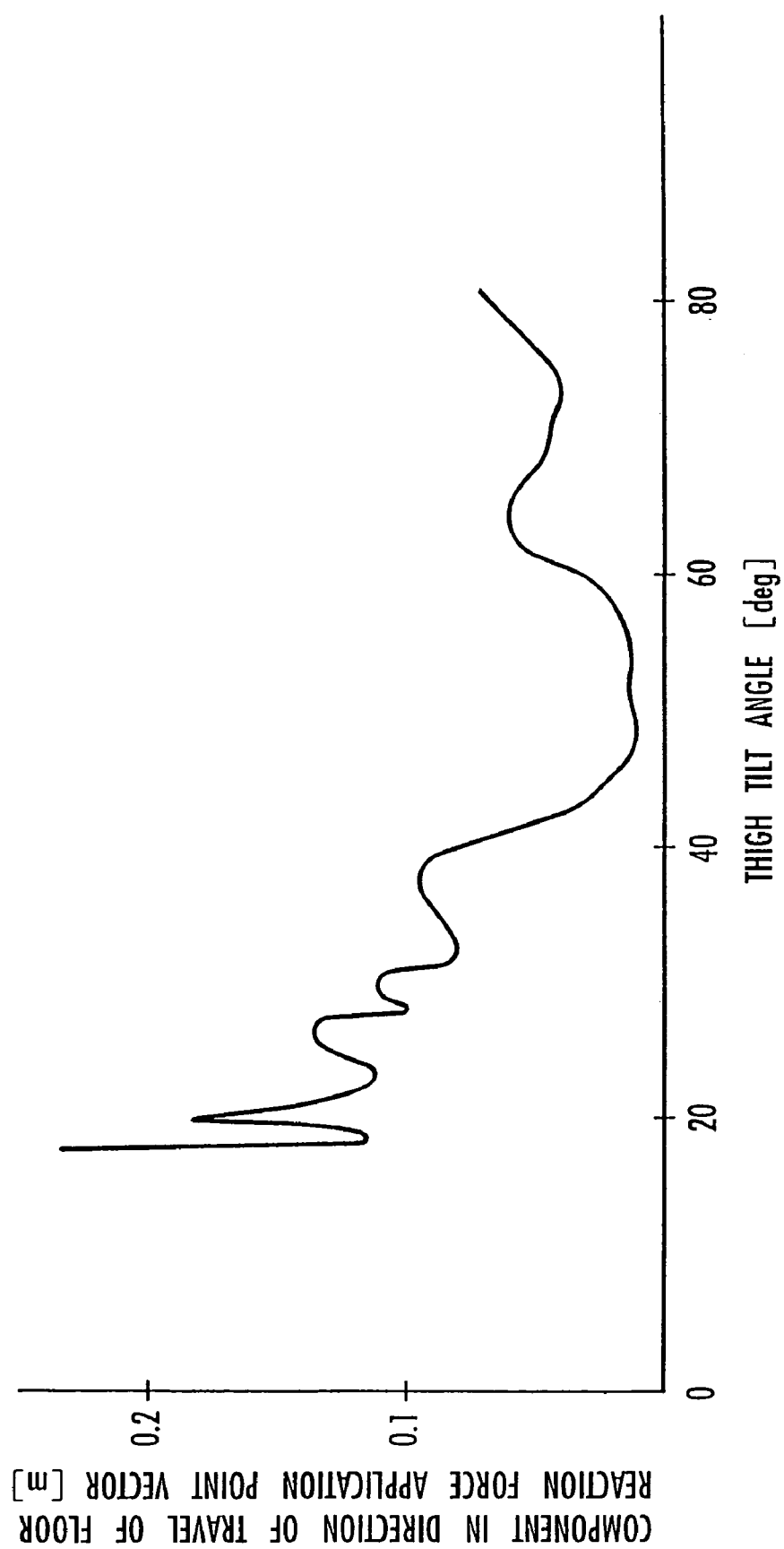
FIG. 10 is a chart illustrating a correlation between the component in the direction of movement of the vector of the floor reaction force application point and the tilt angle of a thigh when walking down stairs.

When the human being 1 is sitting onto a chair or is standing up from the chair, correlations shown in FIG. 7 (when sitting onto a chair) and FIG. 8 (standing up from the chair) hold between the positions of floor reaction force application points and the bending angles Δθd of the knee joint 10. When the human being 1 is climbing or going down stairs, correlations shown in FIG. 9 (when climbing stairs) and FIG. 10 (going down the stairs) hold between the positions of floor reaction force application points and the tilt angles θc of the thigh 9. Therefore, when the human being 1 sits on or stands up from a chair, the position of a floor reaction force application point can be estimated from the bending angle Δθd of the knee joint 10 on the basis of the correlations illustrated in FIG. 7 and FIG. 8. When the human being 1 climbs or goes down stairs, the position of a floor reaction force application point can be estimated from the tilt angles θc of the thigh 9 on the basis of the correlations illustrated in FIG. 9 and FIG. 10.

Meanwhile, concurrently with the processing by the aforementioned means 25 to 34, the arithmetic processing unit 16 carries out processing by the leg body motion determining means 24. In the processing by the leg body motion determining means 24, for each cycle time, detection data of upward accelerations of the waist 3 by the waist vertical accelerometer 21 is compared with a predetermined threshold value that is set in advance. Then, when a detected value of the acceleration exceeds the threshold value, it is determined that the double stance state shown in FIG. 1(b) begins and the single stance state shown in FIG. 1(a) ends. More specifically, while the human being 1 is walking, when the single stance state is replaced by the double stance state, the leg body 2 on the free leg side touching a floor causes a relatively large acceleration (an acceleration that cannot be generated in a normal single stance state) to be generated substantially upwards in the waist 3 in the vicinity of the hip joint 8. For this reason, the leg body motion determining means 24 compares the detection data of the upward accelerations of the waist 3 supplied by the waist vertical accelerometer 21 with the predetermined threshold value so as to determine the start of the double stance state and the end of the single stance state, as described above.

When it is found by the leg body motion determining means 24 that the double stance state has begun, the clocking means 35 starts clocking the time elapsed from the moment the double stance state starts (cycle time at a point when the detection data of the acceleration by the waist vertical accelerometer 21 exceeds the aforesaid threshold value).

Moreover, when the beginning of the double stance state is grasped as mentioned above, the processing by the leg body motion determining means 24 sequentially monitors for each cycle time mentioned above whether the elapsed time measured by the clocking means 35 from the point when the double stance state started has reached an estimated value of a double stance period (duration of the double stance state from the start to the end of the double stance state) determined, as will be discussed hereinafter, by the double stance period estimating means 37 at the point when the double stance state starts. When the elapsed time reaches the estimated value of the double stance period, the leg body motion determining means 24 determines that the double stance state ends and the single stance state starts.

After the processing by the leg body motion determining means 24 is implemented and the processing by the leg body posture calculating means 28 is implemented, the arithmetic processing unit 16 sequentially carries out processing by the moving speed estimating means 36 and the double stance period estimating means 37.

Figure 11:
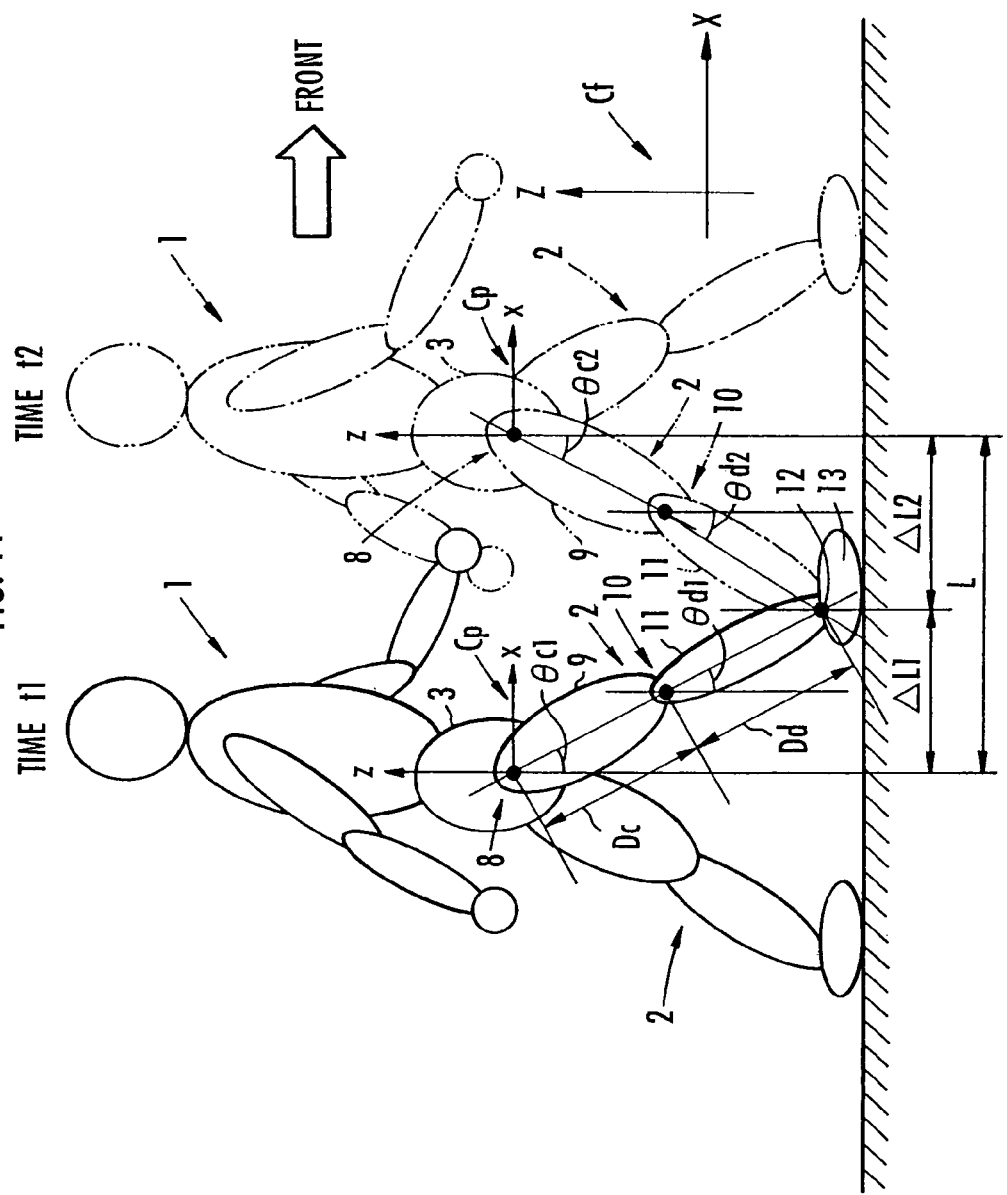
FIG. 11 is a diagram for explaining processing performed by the arithmetic processing unit shown in FIG. 3.

The processing by the moving speed estimating means 36 is carried out as follows. Referring to FIG. 11, when the human being 1 walks, the leg body 2 on the front side of the human being 1 (the leg body 2 on the right side in relation to the direction of travel of the human being 1 in the figure), which is indicated by solid lines, touches a floor, causing the double stance state to start at time t1. A case is assumed where the next double stance state begins at time t2, as shown by the human being 1 indicated by virtual lines (a case where the leg body 2 existing at the rear side of the human being 1 leaves the floor at time t1, then touches the floor at time t2). At this time, a travel distance L of the human being 1 from time t1 to time t2 is a travel distance of the center of the hip joint 8 of the waist 3 in the x-axis direction (the direction of travel of the human being 1) in the absolute coordinate system Cf (this is equal to a movement amount in the x-axis direction of the origin O of the bodily coordinate system Cp in the present embodiment).

The travel distance L substantially coincides with a total sum of a distance ΔL1 in the x-axis direction from the center of the hip joint 8 to the ankle 12 of the leg body 2 on the front side of the human being 1 at time t1 and a distance ΔL2 in the x-axis direction from the center of the hip joint 8 to the ankle 12 of the leg body 2 on the rear side of the human being 1 at time t2 (the leg body 2 that was on the front side of the human being 1 at time t1).

Accordingly, the above distances ΔL1 and ΔL2 and the elapsed time from time t1 to time t2 (t2−t1), i.e., the elapsed time for one step from the start of the double stance state to another start of the double stance state, are determined. This makes it possible to obtain a moving speed V of the human being 1 from time t1 to t2 (average moving speed from time t1 to time t2) according to expression (8) given below, using the distances ΔL1 and ΔL2 and the elapsed time for one step (t2−t1).

$$V = D/(t2-t1) = (\Delta L1 + \Delta L2)/(t2-t1) \qquad (8)$$

In the processing by the moving speed estimating means 36 in the present embodiment, each time the leg body motion determining means 24 finds a start of the double stance state, the distance ΔL1 related to the leg body 2 on the front side of the human being 1 and the distance ΔL2 related to the leg body 2 on the rear side are determined, as explained below, and calculated values of the distances ΔL1 and ΔL2 are stored and retained. Then, the moving speed V of the human being 1 is determined according to the above expression (8), using the distance ΔL2 related to the leg body 2 on the rear side determined at the start of the present double stance state, the distance ΔL1 related to the leg body 2 on the front side determined at the start of the previous double stance state, and time (=t2−t1) measured by the clocking means 35 from the start of the previous double stance state to the start of the present double stance state.

In this case, the aforesaid distances ΔL1 and ΔL2 are determined, as discussed below. Regarding the leg body 2 on the front side of the human being 1 at a start of the double stance state, the tilt angles of the thigh 9 and the crus 11 to be determined by the leg body posture calculating means 28 at a start of the double stance state (the cycle time at which a start of the double stance state is identified by the leg body motion determining means 24) are denoted by θc1 and θd1, respectively (refer to the graph of time t1 of FIG. 11). At this time, the distance ΔL1 related to the leg body 2 is calculated according to expression (9) given below, using data of these tilt angles $\theta c1$ and $\theta d1$ ($\theta c1>0$, $\theta d1>0$) and data of lengths Dc and Dd of the thigh 9 and the crus 11, respectively.

$$\Delta L1 = Dc \cdot \sin\theta c1 + Dd \cdot \sin\theta d1 \quad (9)$$

Similarly, regarding the leg body 2 on the rear side of the human being 1 at a start of the double stance state, if the tilt angles of the thigh 9 and the crus 11 to be determined by the leg body posture calculating means 28 at a start of the double stance state are denoted by $\theta c2$ and $\theta d2$, respectively (refer to the graph of time t2 of FIG. 11), then the distance $\Delta L2$ related to the leg body 2 is calculated according to expression (10) given below, using data of these tilt angles $\theta c2$ and $\theta d2$ ($\theta c2<0$, $\theta d2<0$) and the data of the lengths Dc and Dd of the thigh 9 and the crus 11, respectively.

$$\Delta L2 = -Dc \cdot \sin\theta c2 - Dd \cdot \sin\theta d2 \quad (10)$$

By the processing by the moving speed estimating means 36 explained above, the moving speed V of the human being 1 (to be more specific, the moving speed in one step immediately before the double stance state begins) is estimated each time the double stance state begins. In each cycle time during the period from a start of the double stance state to the next start of the double stance state, an estimated value of the moving speed V is maintained at a constant value.

Figure 12:
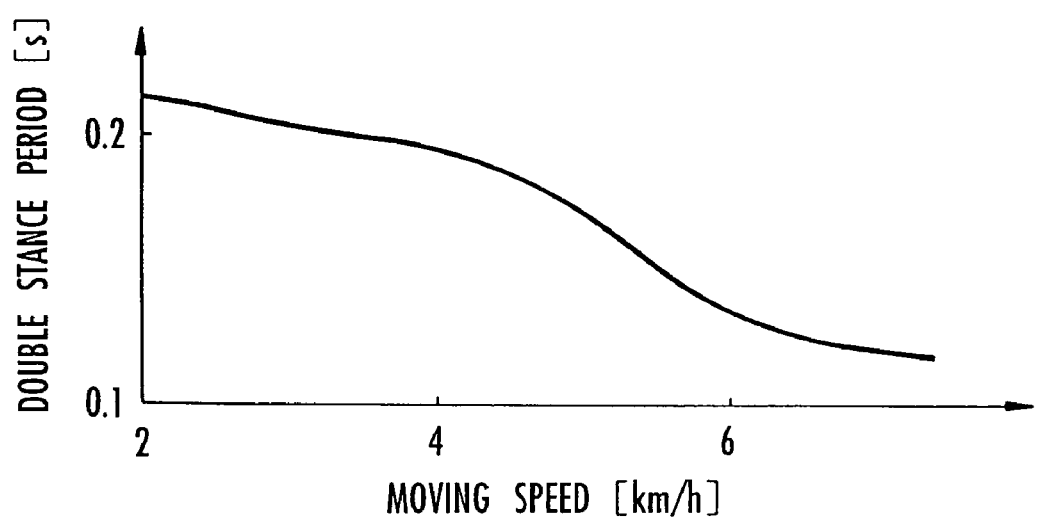
FIG. 12 is a chart showing a correlation between a moving speed of a human being and a double stance period, FIG. 13(*a*) is a chart showing a relationship between double stance time and a component in a vertical direction of a floor reaction force, and FIG. 13(*b*) is a chart showing a relationship between the double stance time and a component in the direction of movement of the floor reaction force.

The processing by the double stance period estimating means 37 is carried out as follows. According to knowledge of the inventors of the present application, the double stance period, which is the duration of the double stance state while the human being 1 is walking, has a close correlation with the moving speed V of the human being 1. More specifically, the double stance period while the human being 1 is walking changes in relation to the moving speed V, as shown in FIG. 12. The double stance period shortens as the moving speed V increases.

In the present embodiment, the correlation shown in FIG. 12 is stored and retained beforehand in the arithmetic processing unit 16 in the form of a data table or polynomial functions approximating it. In the processing by the double stance period estimating means 37, at a start of the double stance state, an estimated value of the double stance period related to the double stance state is determined on the basis of the correlation shown in FIG. 12 from a most recent value of the moving speed V determined by the moving speed estimating means 36 as described above. The estimated value of the double stance period is maintained until the next double stance state begins.

The arithmetic processing unit 16 carries out the processing by the bodily center of gravity acceleration calculating means 31, the leg body motion determining means 24, the clocking means 35, and the double stance period estimating means 37, and thereafter carries out the processing by the floor reaction force estimating means 38 for each cycle time. In the processing by the floor reaction force estimating means 38, data of the acceleration $^T(ax, az)$ of the center of gravity of body G0 determined by the bodily center of gravity acceleration calculating means 31 and the data of a weight M of the human being 1 are used to sequentially determine an estimated value of a total floor reaction force $F=^T(Fx, Fz)$ according to the above expression (2) for each cycle time. In this case, if the motion state of the leg body 2 identified by the leg body motion determining means 24 is the single stance state, then an estimated value of the above total floor reaction force $F=^T(Fx, Fz)$ will be directly determined as an estimated value of the floor reaction force acting on the single leg body 2 in contact with the ground.

Meanwhile, if a motion state of the leg body 2 determined by the leg body determining means 24 is the double stance state, then the floor reaction force estimating means 38 determines the floor reaction forces $Fr=^T(Frx, Frz)$ and $Ff=^T(Ffx, Ffz)$ acting on the respective leg bodies 2 as follows. According to the knowledge of the inventors of the present application, if attention is focused on a relationship between a ratio of each component of the floor reaction force Fr acting on the leg body 2 at the rear side of the human being 1 in the double stance state to each component of a total floor reaction force F at the start of the double stance state (hereinafter referred to as "the floor reaction force ratio") and a ratio of time elapsed from the start of the double stance state to the double stance period (=elapsed time/ double stance period; hereinafter referred to as "the double stance time ratio"), then a characteristic correlation exists between them, and this correlation is hardly influenced by the moving speed V or the like of the human being 1.

Figure 13:
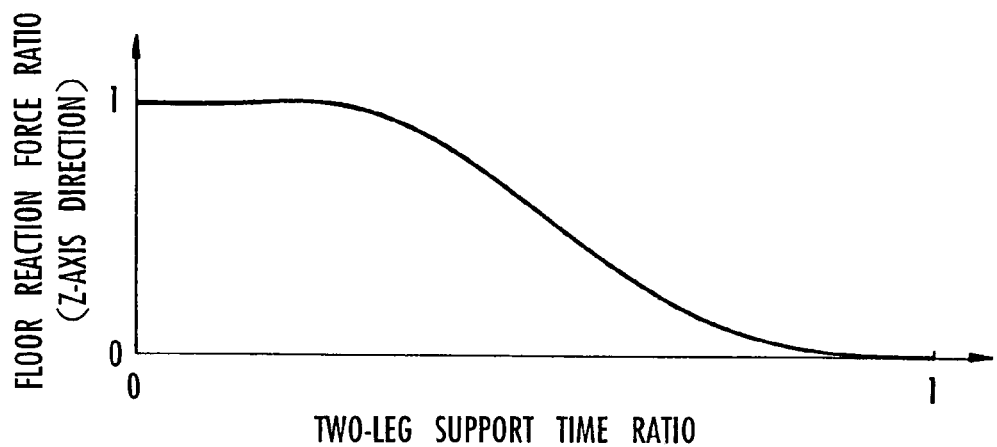
Figure 13:
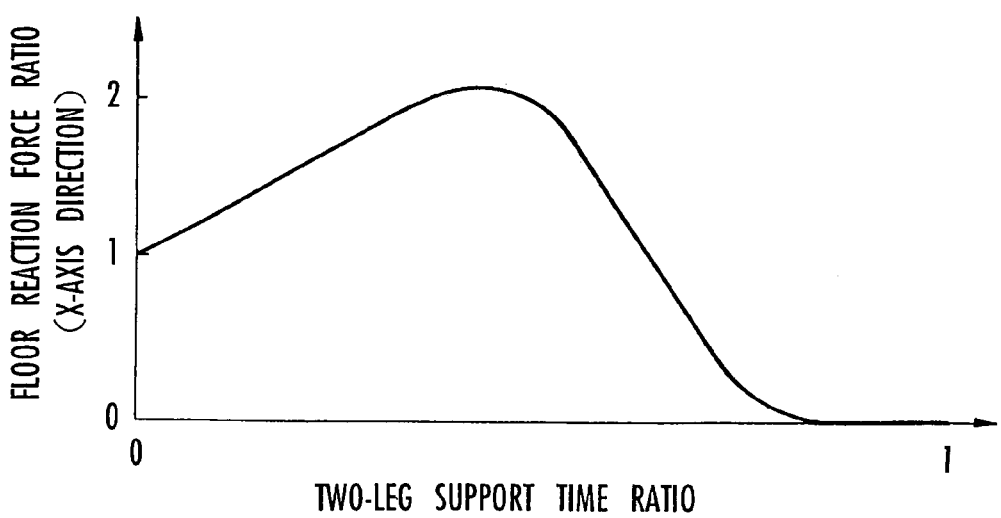

To be more specific, a floor reaction force ratio Frz/Fzs, which denotes a ratio of a component Frz in the Z-axis direction (vertical direction) of the floor reaction force Fr acting on the leg body 2 at the rear side to a component Fz in the Z-axis direction of the total floor reaction force F at a start of the double stance state (hereinafter denoted by a reference character "Fzs"), has a substantially constant correlation shown in FIG. 13(a) with respect to the double stance time ratio independently of the moving speed V or the like of the human being 1. Basically, the floor reaction force ratio Frz/Fzs decreases from "1" to "0" with the lapse of time of the double stance state. Furthermore, the floor reaction force ratio Frx/Fxs, which denotes a ratio of a component Frx in the X-axis direction (horizontal direction of travel of the human being 1) of the floor reaction force Fr acting on the leg body 2 at the rear side to a component Fx in the X-axis direction of the total floor reaction force F at a start of the double stance state (hereinafter denoted by a reference character "Fxs"), has a substantially constant correlation shown in FIG. 13(b) with respect to the double stance time ratio independently of the moving speed V or the like of the human being 1. As the time of the double stance state elapses, the floor reaction force ratio Frx/Fxs first increases from "1," and then decreases to "0."

Accordingly, in the present embodiment, the correlations (the characteristic data) shown in FIGS. 13(a) and (b) are stored and retained beforehand in the arithmetic processing unit 16 in the form of data tables or polynomial functions approximating the correlations. The processing by the floor reaction force estimating means 38 in the double stance state determines an estimated value of the total floor reaction force F and also sequentially determines, for each cycle time, the double stance time ratio from a current value of the clocking data of the elapsed time obtained by the clocking means 35 and a most recent value of data of the estimated value of the double stance period that has been determined by the double stance period estimating means 37. Then, from the data of the determined double stance time ratio, the floor reaction force ratio Frz/Fzs in the Z-axis direction is sequentially determined on the basis of the correlation shown In FIG. 13(a), and then the floor reaction force ratio Frz/Fzs Is multiplied by the component Fzs in the Z-axis direction of the total floor reaction force F at a start of the double stance state so as to sequentially determine the component Frz in the Z-axis direction of the floor reaction force Fr acting on the leg body 2 at the rear side. Similarly, from the obtained date of the double stance time ratio and based on the correlation shown in FIG. 13(b), the floor reaction force ratio Frx/Fxs in the X-axis direction is sequentially determined, and then the floor reaction force ratio Frx/Fxs is multiplied by the component Fxs in the X-axis direction of the total floor reaction force F at a start of the double stance state so as to sequentially determine the component Frx in the X-axis direction of the floor reaction force Fr acting on the leg body 2 at the rear side.

Furthermore, according to the above expression (3), the floor reaction force $Fr={}^T(Frx, Frz)$ related to the leg body 2 at the rear side is subtracted from the total floor reaction force $F={}^T(Fx, Fz)$ determined in each cycle time (vector subtraction) so as to sequentially obtain a floor reaction force $Ff={}^T(Ffx, Ffz)={}^T(Fx-Frx, Fz-Frz)$ related to the leg body 2 on the front side. Thus, the floor reaction forces Fr and Ff of the respective two leg bodies 2 and 2 in the double stance state will be sequentially determined.

Next, the arithmetic processing unit 16 carries out processing of the joint moment estimating means 39 to determine moments acting on the knee joint 10 and the hip joint 8 of each leg body 2. This processing is carried out on the basis of the so-called inverse dynamic model, using current values of data obtained by the floor reaction force estimating means 38, the means 32 that calculates an acceleration of each portion of a leg body, the means 33 that calculates an angular acceleration of each portion of a leg body, the floor reaction force application point estimating means 34 and the leg body posture calculating means 28, respectively. The inverse dynamic model is used to determine moments acting on joints in order, beginning with a joint closest to a floor reaction force application point, using an equation of motion related to translational motions of portions corresponding to the rigid bodies of the human being 1 and an equation of motion related to rotational motions thereof. In the present embodiment, moments acting on the knee joint 10 and the hip joint 8 of each leg body 2 are determined in order.

Figure 14:
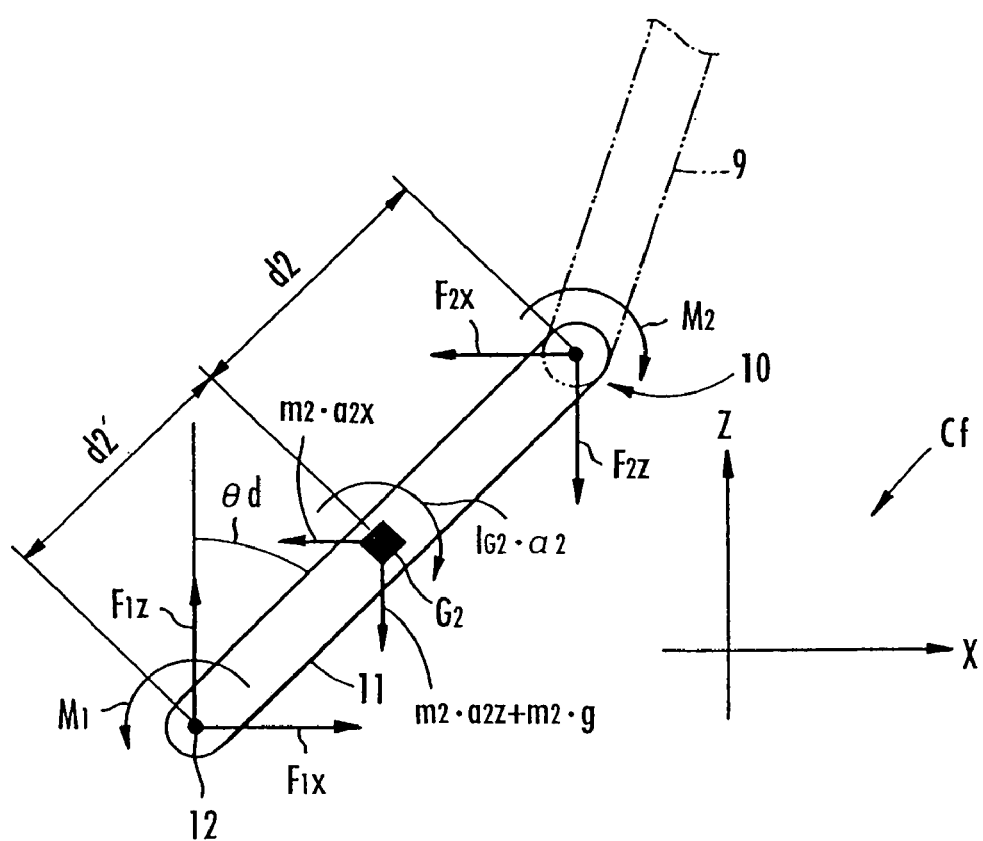
FIG. 14 is a diagram for explaining processing performed by the arithmetic processing unit shown in FIG. 3.

More detailed, referring to FIG. 14, regarding the crus 11 of each leg body 2, a force (joint reaction force) acting on the ankle 12 at a distal end of the crus 11, a force (joint reaction force) acting on the knee joint 10 of the crus 11, and a translational acceleration of the center of gravity G2 of the crus 11 are represented by ${}^T(F_1x, F_1z)$, ${}^T(F_2x, F_2z)$, and ${}^T(a_2x, a_2z)$, respectively, according to component notation in the absolute coordinate system Cf, and the weight of the crus 11 is denoted by $m_2$. At this time, the equation of motion related to the translational motion of the center of gravity G2 of the crus 11 will be represented by expression (11) given below:

$$^T(m_2 \cdot a_2x, m_2 \cdot a_2z) = {}^T(F_1x - F_2x, F_1z - F_2z - m_2 \cdot g) \quad (11)$$

$$\text{therefore, } {}^T(F_2x - F_2z)$$

$$= {}^T(F_1x - m_2 \cdot a_2x, F_1z - m_2 \cdot a_2z - m_2 \cdot g)$$

The acceleration ${}^T(a_2x, a_2z)$ of the center of gravity G2 of the crus 11 is determined by the means 32 that calculates an acceleration of each portion of a leg body. The joint reaction force ${}^T(F_1x, F_1z)$ acting on the ankle 12 at the distal end of the crus 11 is approximately equal to an estimated value of a floor reaction force determined by the floor reaction force estimating means 38 on the leg body 2 having the crus 11. More specifically, in the single stance state, if the leg body 2 is in contact with the ground, then the joint reaction force ${}^T(F_1x, F_1z)$ is the floor reaction force ${}^T(Fx, Fz)$ obtained by the above expression (2). If the leg body 2 is a free leg, then ${}^T(F_1x, F_1z)={}^T(0, 0)$. In the double stance state, if the leg body 2 is the leg body at the rear side in relation to the direction of travel of the human being 1, then the joint reaction force ${}^T(F_1x, F_1z)$ is the floor reaction force ${}^T(Frx, Frz)$ determined as described above, using the correlations illustrated in FIGS. 13 (a) and (b). If the leg body 2 is the leg body at the front side, then the joint reaction force ${}^T(F_1x, F_1z)$ is the floor reaction force ${}^T(Ffx, Ffz)$ determined as described above according to the above expression (3).

Hence, the joint reaction force ${}^T(F_2x, F_2z)$ acting on the knee joint 10 of each leg body 2 is determined according to the above expression (11) from data of the acceleration ${}^T(a_2x, a_2z)$ of the center of gravity G2 of the crus 11 determined by the means 32 that calculates an acceleration of each portion of a leg body, data of the floor reaction force $(={}^T(F_1x, F_1z))$ determined by the floor reaction force estimating means 38, data of the weight $m_2$ of the crus 11 determined in advance, and a value of the gravitational acceleration g.

Referring to FIG. 14, a moment acting on the ankle 12 at the distal end of the crus 11 is denoted by $M_1$, a moment acting on the knee joint 10 of the crus 11 is denoted by $M_2$, a moment of inertia around the center of gravity G2 of the crus 11 is denoted by $I_{G2}$, and an angular acceleration around the center of gravity G2 of the crus 11 is denoted by $\alpha_2$. In addition, if the distance between the center of gravity G2 of the crus 11 and the center of the knee joint 10 is denoted by $d_2$, and the distance between the center of gravity G2 of the crus 11 and the ankle 12 is denoted by $d_2'$ $(=Dd-d_2)$ in association with FIG. 4, then the equation of motion related to the rotational motion around the center of gravity G2 of the crus 11 is represented by the following expression (12):

$$I_{G2} \cdot \alpha_2 = M_1 - M_2 + F_1x \cdot d_2' \cdot \cos\theta d - F_1z \cdot d_2' \cdot \sin\theta d + F_2x \cdot d_2 \cdot \cos\theta d - F_2z \cdot d_2 \cdot \sin\theta d$$

therefore, $$M_2 = M_1 - I_{G2} \cdot \alpha_2 + F_1x \cdot d_2' \cdot \cos\theta d - F_1z \cdot d_2' \cdot \sin\theta d + F_2x \cdot d_2 \cdot \cos\theta d - F_2z \cdot d_2 \cdot \sin\theta d \quad (12)$$

$M_1$ in expression (12) denotes a moment obtained as a cross product (vector product) of a floor reaction force application point vector determined by the floor reaction force application point estimating means 34 on the leg body 2 having the crus 11 involved in the expression (12) and a floor reaction force vector determined by the floor reaction force estimating means 38 on the leg body 2. $\alpha_2$ denotes an angular acceleration of the crus 11 determined by the means 33 that calculates an angular acceleration of each portion of a leg body. $\theta d$ denotes a tilt angle of the crus 11 determined by the leg body posture calculating means 28. ${}^T(F_1x, F_1z)$ denotes an estimated value of a floor reaction force determined by the floor reaction force estimating means 38, as is mentioned before. ${}^T(F_2x, F_2z)$ is determined by the above expression (11). The moment of inertia $I_{G2}$ is determined and stored in the arithmetic processing unit 16 together with data, including the weight $m_2$ and sizes, of the crus 11 in advance.

Hence, the moment $M_2$ acting on the knee joint 10 is determined according to the above expression (12), using data of an estimated value of a floor reaction force by the floor reaction force estimating means 38, data of a floor reaction force application point vector by the floor reaction force application point estimating means 34, data of the angular acceleration $\alpha_2$ of the crus 11 by the means 33 that calculates an angular acceleration of each portion of a leg body, data of the tilt angle $\theta d$ of the crus 11 by the leg body posture calculating means 28, data of a joint reaction force ${}^T(F_2x, F_2z)$ determined by the above expression (11), data of the moment of inertia $I_{G2}$, size (Dd), and the position ($d_2$) of the center of gravity $G_2$ of the crus 11, which are determined in advance.

The joint moment estimating means 39 determines the moment $M_2$ acting on the knee joint 10 of the crus 11 as discussed above, then performs the same processing as the calculation processing to determine a moment acting on the hip joint 8 of the thigh 9. A basic concept of the processing is identical to the method for determining the moment $M_2$ of the knee joint 10, so that detailed illustrations and explanation will be omitted; however, an outline will be given below.

First, a joint reaction force $^T(F_3x, F_3z)$ acting on the hip joint 8 of the thigh 9 is first determined according to the following expression (13) (expression in the same form as that of the above expression (11)) based on the equation of motion related to the translational motion of the center of gravity G1 (refer to FIG. 4) of the thigh 9:

$$^T(F_3x, F_3z) = {}^T(F_2x - m_1 \cdot a_1 x, F_2 z - m_1 \cdot a_1 z - m_1 \cdot g) \qquad (13)$$

$^T(F_2x, F_2z)$ denotes a joint reaction force of the knee joint 10 previously determined by the above expression (11). $^T(a_1x, a_1z)$ denotes an acceleration (translational acceleration) in the absolute coordinate system Cf of the center of gravity G1 of the thigh 9 determined by the means 32 that calculates an acceleration of each portion of a leg body. $m_1$ denotes the weight of the thigh 9 determined beforehand, and g denotes a gravitational acceleration.

Then, a moment $M_3$ acting on the hip joint 8 of the thigh 9 is determined according to the following expression (14) (expression having the same form as that of the above expression (12)) based on the equation of motion related to the rotational motion around the center of gravity G1 of the thigh 9.

$$M_3 = M_2 - I_{G1} \cdot \alpha_1 + F_2 x \cdot d_1' \cdot \cos\theta c - F_2 z \cdot d_1' \cdot \sin\theta c + F_3 x \cdot d_1 \cdot \cos\theta c - F_3 z \cdot d_1 \cdot \sin\theta c \qquad (14)$$

$M_2$ denotes a moment of the knee joint 10 determined according to the above expression (12), $^T(F_2x, F_2z)$ denotes a joint reaction force of the knee joint 10 determined by the above expression (11), $^T(F_3x, F_3z)$ denotes a joint reaction force of the hip joint 8 determined by the above expression (13), $I_{G1}$ denotes a moment of inertia around the center of gravity G1 of the thigh 9 determined beforehand, $\alpha_1$ denotes an angular acceleration of the thigh 9 determined by the means 33 that calculates an angular acceleration of each portion of a leg body, and $\theta c$ denotes a tilt angle of the thigh 9 determined by the leg body posture calculating means 28. Further, $d_1$ denotes the distance from the center of the hip joint 8 to the center of gravity G1 of the thigh 9 (refer to FIG. 4), and $d_1'$ denotes the distance from the center of the knee joint 10 to the center of gravity GI of the thigh 9 (Dc–$d_1$ in FIG. 4), these distances being dependent upon the position of the center of gravity G1 and the size (length) of the thigh 9 determined in advance.

The processing explained above is sequentially executed for each cycle time of the arithmetic processing unit 16 to sequentially estimate in real time the floor reaction forces acting on the respective leg bodies 2, and moments acting on the knee joints 10 and the hip joints 8 of the respective leg bodies 2.

Although detailed explanation will be omitted in the present description, the estimated values of the moments of the knee joint 10 and the hip joint 8 that have been obtained are used, for example, to control an apparatus adapted to aid the human being 1 in walking (an apparatus that includes an electric motor or the like capable of supplying auxiliary torque to the knee joints 10 and the hip joints 8).

Time-dependent change in an estimated value of a floor reaction force (an absolute value of the estimated value of the floor reaction force, to be more specific) determined by the processing performed by the arithmetic processing unit 16 described above is illustrated by the solid lines in FIG. 15. Furthermore, time-dependent changes in estimated values of moments on the knee joints 10 and the hip joints 8 determined by the processing performed by the arithmetic processing unit 16 are illustrated by the solid lines in FIG. 16. FIG. 15 and FIG. 16 illustrate cases where the human being 1 walks on a level ground at a substantially constant speed. In this case, in FIG. 15, a comparative example (equivalent to a true value of the floor reaction force) in which floor reaction forces have been actually measured using a force meter or the like is also shown by virtual lines. In FIG. 16, a comparative example (equivalent to true values of the moments on the knee joint 10 and the hip joint 8) in which the moments on the knee joint 10 and the hip joint 8 have been actually measured using a torque meter or the like is also shown by virtual lines.

As is obvious from FIG. 15, the present embodiment allows highly accurate estimated values of the floor reaction forces to be obtained. Moreover, the present embodiment allows the moments on the knee joint 10 and the hip joint 8 to be estimated with relatively high accuracy, as shown in FIG. 16 by using the estimated values of the floor reaction forces.

Thus, according to the present embodiment, it is possible to easily estimate, in real time, floor reaction forces acting on the respective leg bodies 2 and moments acting on the hip joints 8 and the knee joints 10 of the respective leg bodies 2 by using relatively small and light-weight sensors, such as the angle sensors 22 and 23 attached to the hip joint 8 and knee joint 10, gyro sensors 14 and 19 and accelerometers 15,20 and 21 attached to the torso 5. This obviates the need for providing the leg bodies 2 with sensors that interfere with walking of the human being 1 or add load to motions of the leg bodies 2. Moreover, the estimation can be achieved with relatively high accuracy without depending on the moving speed V or the like.

In the embodiment explained above, during the processing performed by the leg body motion determining means 24, when the time elapsed from a start of the double stance state reaches an estimated value of the double stance period, an end of the double stance state and a start of the single stance state were determined. As an alternative example, however, an end of the double stance state and a start of the single stance state may be determined as follows. An absolute value of a floor reaction force $Fr = \sqrt{(Frx^2 + Frz^2)}$ determined for each cycle time by the floor reaction force estimating means 38 on the leg body 2 at the rear side of the human being 1 (the leg body 2 that leaves a floor upon an end of the double stance state) in the double stance state is sequentially compared with a predetermined threshold value (a positive value of almost "0") that is set beforehand. When an absolute value of the floor reaction force Fr reduces down to the threshold value or less (when the absolute value reaches almost "0"), it is determined that the double stance state has ended and the single stance state has begun. This also permits accurate determination to be achieved.

In the present embodiment, the explanation has been given, taking case where the present invention has been applied to the human being 1 as an example. The present invention, however, can be applied also to a bipedal walking robot as a bipedal walking body. Some bipedal walking robots are constructed to have their waists and chests combined into one. In such a case, it is possible to attach a gyro sensor and a longitudinal accelerometer only to one of the waist and the chest to estimate floor reaction forces and moments on joints of leg bodies in the same manner as that in the present embodiment. Furthermore, in a bipedal walking robot, the bending angles of hip joints and knee joints can be alternatively determined by control amounts of a controller for actuators of the joints.

Furthermore, in the present embodiment, detection data of the waist vertical accelerometer 21 has been used as it is to determine a motional state of the leg body 2. In place of the detection data, however, a value of, for example, a component in a vertical direction (the Z-axis direction) of the acceleration $a_0$ of the waist 3 in the absolute coordinate system Cf that is determined by the reference acceleration measuring means 27 may be used.

INDUSTRIAL APPLICABILITY

As described above, the present invention is useful for determining floor reaction forces and joint moments acting on leg bodies of a mobile body when aiding a bipedal walking body, such as a human being or a robot, in walking or conducting walking control thereof.

The invention claimed is:

1. A method of estimating floor reaction forces acting on respective leg bodies of a bipedal walking body, comprising:
    a first step for determining whether a motion state of leg bodies of the bipedal walking body is a single stance state wherein only one of the leg bodies is in contact with the ground or a double stance state wherein both leg bodies are in contact with the ground;
    a second step for sequentially determining positions of the center of gravity of the bipedal walking body while also sequentially determining accelerations of the center of gravity in an absolute coordinate system fixed with respect to the ground, using time-series data of the positions of the center of gravity;
    a third step for sequentially determining estimated value of total floor reaction force on the basis of an equation of motion of the centers of gravity represented by a weight of the bipedal walking body, gravitational accelerations, the accelerations of the center of gravity, and total floor reaction force, which is a resultant force of the floor reaction forces acting on the respective leg bodies;
    a fourth step for sequentially measuring time elapse from a start of the double stance state until an end thereof each time the double stance state begins;
    a fifth step for measuring a moving speed of the bipedal walking body at least on or before each double stance state begins;
    a step of sequentially determining estimated values of the total floor reaction force, when the bipedal walking body is in the single stance state, as estimate values of floor reaction forces acting on a single leg body in contact with the ground; and
    a step of sequentially determining estimated values of floor reaction forces acting on one of the two leg bodies, when the bipedal walking body is in the double stance state, the one leg body being located at the rear side in relation to the direction of travel of the bipedal walking body, on the basis of characteristic data pre-established as indicative of characteristics of changes in floor reaction force acting on the one leg body with respect to the elapsed time of the double stance state and moving speed of the bipedal walking body, and sequentially determining estimated values of the floor reaction forces acting on the other leg body by subtracting the determined estimated values of the floor reaction forces of the one leg body from the estimated values of the total floor reaction force.

2. The method according to claim 1, wherein
    the characteristic data is data indicating a relationship between a ratio of a floor reaction force of the one leg body to the total floor reaction force at a start of the double stance state and a ratio of the elapsed time to a duration from a start to an end of the double stance state,
    a duration of the double stance state is estimated from a measured value of the moving speed on the basis of a pre-established correlation between the moving speed of the bipedal walking body and the duration of the double stance state, and estimated values of floor reaction forces acting on the one leg are sequentially determined on the basis of the estimated value of the duration of the double stance state, a measured value of the elapsed time, an estimated value of the total floor reaction force at the start of the double stance state, and the characteristic data.

3. The method according to claim 1, further comprising the steps of:
    measuring a tilt angle of a crus under a knee joint of each leg body of the bipedal walking body and a tilt angle of a thigh between a hip joint and a knee joint of the leg body at a start of each double stance state;
    calculating, at a start of each double stance state, a shift amount of a position of a bottom end portion of the crus of the leg body with respect to the hip joint of the leg body existing at the rear side in relation to the direction of travel of the bipedal walking body, the shift taking place in the direction of travel of the bipedal walking body from the start of the preceding double stance state, on the basis of measured values of tilt angles of the thigh and the crus of the leg body and pre-acquired sizes of the thigh and the crus of the leg body each time the double stance state begins; and
    measuring the time elapsed from a start of each double stance state to a start of the next double stance state as elapsed time for one step,
    wherein in the fifth step, each time the double stance state begins, the shift amount calculated at the start is divided by the one-step elapsed time measured from a start of the preceding double stance state to a start of the present double stance state so as to obtain a measured value of the moving speed.

4. The method according to claim 1, further comprising the steps of:
    sequentially measuring a vertical acceleration of a lower portion of a torso, which is adjacent to a hip joint, the torso being supported on the two leg bodies through the intermediary of hip joints of the leg bodies,
    wherein a motion state of the bipedal walking body is determined in the first step as the beginning of the double stance state and the end of the single stance state when the vertical acceleration of the lower portion of the torso increases to a predetermined threshold value or more, and as the end of the double stance state and the beginning of the single stance state when an estimated value of the floor reaction force acting on the leg body at the rear side in relation to the direction of travel of the bipedal walking body in the double stance state decreases to a predetermined threshold value or less.

5. The method according to claim 2, comprising the steps of:
measuring a vertical acceleration of a lower portion of a torso, which is adjacent to a hip joint, the torso being supported on the two leg bodies through the intermediary of hip joints of the leg bodies,
wherein a motion state of the bipedal walking body is determined in the first step as the beginning of the double stance state and the end of the single stance state when the vertical acceleration of the lower portion of the torso increases to a predetermined threshold value or more, and as the end of the double stance state and the beginning of the single stance state when a measured value of time elapsed from the start of the double stance state reaches an estimated value of a duration of the double stance state.

6. The method according to claim 1, comprising the steps of:
sequentially measuring tilt angles of a torso supported on the two leg bodies through the intermediary of hip joints of the respective leg bodies, bending angles of at least hip joints and knee joints of the respective leg bodies, and accelerations in the absolute coordinate system of a predetermined reference point of the bipedal walking body,
wherein in the second step, positions of the center of gravity of the bipedal walking body with respect to the reference point are sequentially determined on the basis of tilt angles of the torso, bending angles of the hip joints and the knee joints, a rigid body link model representing the bipedal walking body in the form of a link assembly of a plurality of rigid bodies, pre-acquired weights of individual portions of the bipedal walking body, which correspond to individual rigid bodies of the rigid body link model, and the pre-acquired positions of the centers of gravity of the portions corresponding to rigid bodies in the individual portions corresponding to rigid bodies, accelerations of the center of gravity with respect to the reference point are sequentially determined on the basis of time-series data of the positions of the center of gravity, and accelerations of the center of gravity in the absolute coordinate system are determined from the accelerations of the center of gravity with respect to the reference point and the accelerations of the reference point in the absolute coordinate system.

7. The method according to claim 6, wherein the reference point is set in the torso.

8. The method according to claim 6, wherein the torso has a waist connected to the two leg bodies through the intermediary of hip joints, and a chest located on the waist such that it can be tilted with respect to the waist, wherein tilt angles of the torso used to determine a position of the center of gravity are tilt angles of the waist and the chest, respectively.

9. The method according to claim 8, wherein the rigid body link model is a model in which cruses under knee joints of the respective leg bodies, thighs between the knee joints and the hip joints, the waist, and a body that includes the chest located on the upper side of the waist of the bipedal walking body are respectively represented in the form of rigid bodies.

10. A method of estimating moments acting on at least one joint of each leg body of the bipedal walking body by using estimated values of floor reaction forces related to each leg body that have been sequentially determined according to the method of estimating floor reactions of a bipedal walking body described in claim 1, comprising the steps of:
sequentially measuring tilt angles of a torso supported on the two leg bodies through the intermediary of hip joints of the respective leg bodies, bending angles of at least hip joints and knee joints of the respective leg bodies, and accelerations of a pre-established reference point of the bipedal walking body in the absolute coordinate system;
sequentially determining tilt angles of portions corresponding to rigid bodies of the bipedal walking body that are associated with respective rigid bodies of a rigid body link model on the basis of tilt angles of the torso, bending angles of the respective hip joints and the knee joints of the leg bodies, and the rigid body link model representing the bipedal walking body in the form of a link assembly of a plurality of rigid bodies;
sequentially determining positions of centers of gravity of the portions corresponding to rigid bodies in relation to the reference point on the basis of tilt angles of the portions corresponding to the rigid bodies, pre-obtained weights of the portions corresponding to the rigid bodies, and pre-obtained positions of centers of gravity of the portions corresponding to the rigid bodies in the individual portions corresponding to the rigid bodies, and sequentially determining accelerations of the centers of gravity of the portions corresponding to the rigid bodies with respect to the reference point on the basis of time-series data of the positions of centers of gravity of the portions corresponding to the rigid bodies;
sequentially determining accelerations of the centers of gravity of the portions corresponding to the rigid bodies in the absolute coordinate system from the accelerations of the centers of gravity of the portions corresponding to the rigid bodies in relation to the reference point and the accelerations of the reference point in the absolute coordinate system;
sequentially determining angular accelerations of the portions corresponding to the rigid bodies on the basis of time-series data of the tilt angles of the portions corresponding to the rigid bodies; and
sequentially determining estimated positions of points of application of floor reaction forces of the leg bodies in the bipedal walking body on the basis of at least either tilt angles of thighs of the leg bodies as the portions corresponding to the rigid bodies of the bipedal walking body or bending angles of knee joints of the leg bodies,
wherein moments acting on at least one joint of the leg bodies of the bipedal walking body are estimated on the basis of an inverse dynamic model by using the estimated values of the floor reaction forces, estimated positions of points of application of floor reaction forces, the accelerations of the centers of gravity of the portions corresponding to the rigid bodies and the angular accelerations of the portions corresponding to the rigid bodies in the absolute coordinate system, the tilt angles of the portions corresponding to the rigid bodies, the pre-acquired weights and sizes of the portions corresponding to the rigid bodies, the pre-acquired positions of the centers of gravity of the portions corresponding to the rigid bodies in the respective portions corresponding to the rigid bodies, and pre-acquired inertial moments of the portions corresponding to the rigid bodies.

11. A method of estimating moments acting on at least one joint of each leg body of the bipedal walking body by using estimated values of floor reaction forces related to each leg body that have been sequentially determined according to the method of estimating floor reactions of a bipedal walking body described in claim 6, comprising the steps of:

sequentially determining tilt angles in the absolute coordinate system of respective portions corresponding to rigid bodies of the bipedal walking body that are associated with respective rigid bodies of a rigid body link model on the basis of tilt angles of the torso, bending angles of the hip joints and the knee joints of the leg bodies, and the rigid body link model;

sequentially determining positions of centers of gravity of the portions corresponding to rigid bodies in relation to the reference point on the basis of tilt angles of the portions corresponding to the rigid bodies, pre-obtained weights of the portions corresponding to the rigid bodies, and positions of centers of gravity of the portions corresponding to the rigid bodies in the individual portions corresponding to the rigid bodies, and sequentially determining accelerations of the centers of gravity of the portions corresponding to the rigid bodies with respect to the reference point on the basis of time-series data of the positions of centers of gravity of the portions corresponding to the rigid bodies;

sequentially determining accelerations of the centers of gravity of the portions corresponding to the rigid bodies in the absolute coordinate system from the accelerations of the centers of gravity of the portions corresponding to the rigid bodies in relation to the reference point and the accelerations of the reference point in the absolute coordinate system;

sequentially determining angular accelerations of the portions corresponding to the rigid bodies on the basis of time-series data of the tilt angles of the portions corresponding to the rigid bodies; and sequentially determining estimated positions of points of application of floor reaction forces of the leg bodies in the bipedal walking body on the basis of at least tilt angles of thighs of the leg bodies as the portions corresponding to the rigid bodies of the bipedal walking body or bending angles of knee joints of the leg bodies, wherein moments acting on at least one joint of the leg bodies of the bipedal walking body are estimated on the basis of an inverse dynamic model by using the estimated values of the floor reaction forces, estimated positions of points of application of floor reaction forces, the accelerations of the centers of gravity of the portions corresponding to the rigid bodies and the angular accelerations of the portions corresponding to the rigid bodies in the absolute coordinate system, the tilt angles of the portions corresponding to the rigid bodies, the pre-acquired weights and sizes of the portions corresponding to the rigid bodies, the pre-acquired positions of the centers of gravity of the portions corresponding to the rigid bodies in the respective portions corresponding to the rigid bodies, and pre-acquired inertial moments of the portions corresponding to the rigid bodies.

* * * * *